(12) United States Patent
Hirakawa et al.

(10) Patent No.: US 9,862,448 B2
(45) Date of Patent: Jan. 9, 2018

(54) VEHICLE

(71) Applicant: YAMAHA HATSUDOKI KABUSHIKI KAISHA, Iwata-shi, Shizuoka (JP)

(72) Inventors: Nobuhiko Hirakawa, Shizuoka (JP); Kazuhisa Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/279,751

(22) Filed: Sep. 29, 2016

(65) Prior Publication Data
US 2017/0088220 A1    Mar. 30, 2017

(30) Foreign Application Priority Data

Sep. 30, 2015 (JP) .................. 2015-194218

(51) Int. Cl.
| | |
|---|---|
| *B62K 5/10* | (2013.01) |
| *B60G 13/00* | (2006.01) |
| *B62K 5/05* | (2013.01) |
| *B62K 5/08* | (2006.01) |
| *B62K 5/027* | (2013.01) |
| *B62K 21/18* | (2006.01) |
| *B62K 5/00* | (2013.01) |

(52) U.S. Cl.
CPC ............. *B62K 5/10* (2013.01); *B60G 13/005* (2013.01); *B62K 5/027* (2013.01); *B62K 5/05* (2013.01); *B62K 5/08* (2013.01); *B62K 21/18* (2013.01); *B60G 2300/122* (2013.01); *B62K 2005/001* (2013.01)

(58) Field of Classification Search
CPC ....... B62K 5/08; B62K 5/10; B62K 2005/001
See application file for complete search history.

(56) References Cited

U.S. PATENT DOCUMENTS

| | | | | |
|---|---|---|---|---|
| 8,262,111 | B2 * | 9/2012 | Lucas | B60G 3/20 180/210 |
| 8,814,186 | B1 * | 8/2014 | Rinda | B62K 5/06 280/124.135 |
| 2005/0167174 | A1 * | 8/2005 | Marcacci | B60G 17/0152 180/76 |
| 2009/0108555 | A1 * | 4/2009 | Wilcox | B60G 7/008 280/93.51 |

(Continued)

FOREIGN PATENT DOCUMENTS

| | | |
|---|---|---|
| CN | 101774414 A | 7/2010 |
| DE | 808 191 C | 7/1951 |

(Continued)

*Primary Examiner* — Nicole T Verley
(74) *Attorney, Agent, or Firm* — Keating & Bennett, LLP

(57) ABSTRACT

In a vehicle, a left shock absorber is disposed such that a left telescopic axis is positioned on the left of a left steering axis in a left-right direction of a body frame when a vehicle in which the body frame is standing upright is viewed from a front in a front-rear direction of the body frame. A right shock absorber is disposed such that a right telescopic axis is positioned on the right of a right steering axis in the left-right direction of the body frame when the vehicle in which the body frame is standing upright is viewed from the front in the front-rear direction of the body frame.

12 Claims, 12 Drawing Sheets

(56) References Cited

U.S. PATENT DOCUMENTS

| | | | |
|---|---|---|---|
| 2015/0232147 A1* | 8/2015 | Hirayama | B62K 21/02 |
| | | | 280/267 |
| 2015/0259027 A1 | 9/2015 | Takano et al. | |
| 2015/0321721 A1* | 11/2015 | Sasaki | B62K 5/05 |
| | | | 180/210 |
| 2016/0107713 A1* | 4/2016 | Takano | B62K 5/027 |
| | | | 180/210 |
| 2016/0152278 A1* | 6/2016 | Kawashiri | B60Q 1/0035 |
| | | | 180/89.1 |
| 2016/0152293 A1* | 6/2016 | Hirayama | B62K 5/05 |
| | | | 280/124.103 |
| 2016/0185413 A1* | 6/2016 | Takano | B62K 21/00 |
| | | | 280/124.103 |
| 2016/0244118 A1* | 8/2016 | Tanabe | B62J 23/00 |
| 2016/0280193 A1* | 9/2016 | Seto | B60T 8/1706 |

FOREIGN PATENT DOCUMENTS

| | | | |
|---|---|---|---|
| EP | 1 561 612 A1 | 8/2005 | |
| EP | 1 571 016 A1 | 9/2005 | |
| EP | 1 666 346 A1 | 6/2006 | |
| JP | 2130731 B1 * | 7/2015 | B60T 8/3685 |
| JP | 3069979 A2 * | 9/2016 | B60G 13/003 |
| WO | 2014/065396 A1 | 5/2014 | |

* cited by examiner

FIG. 4
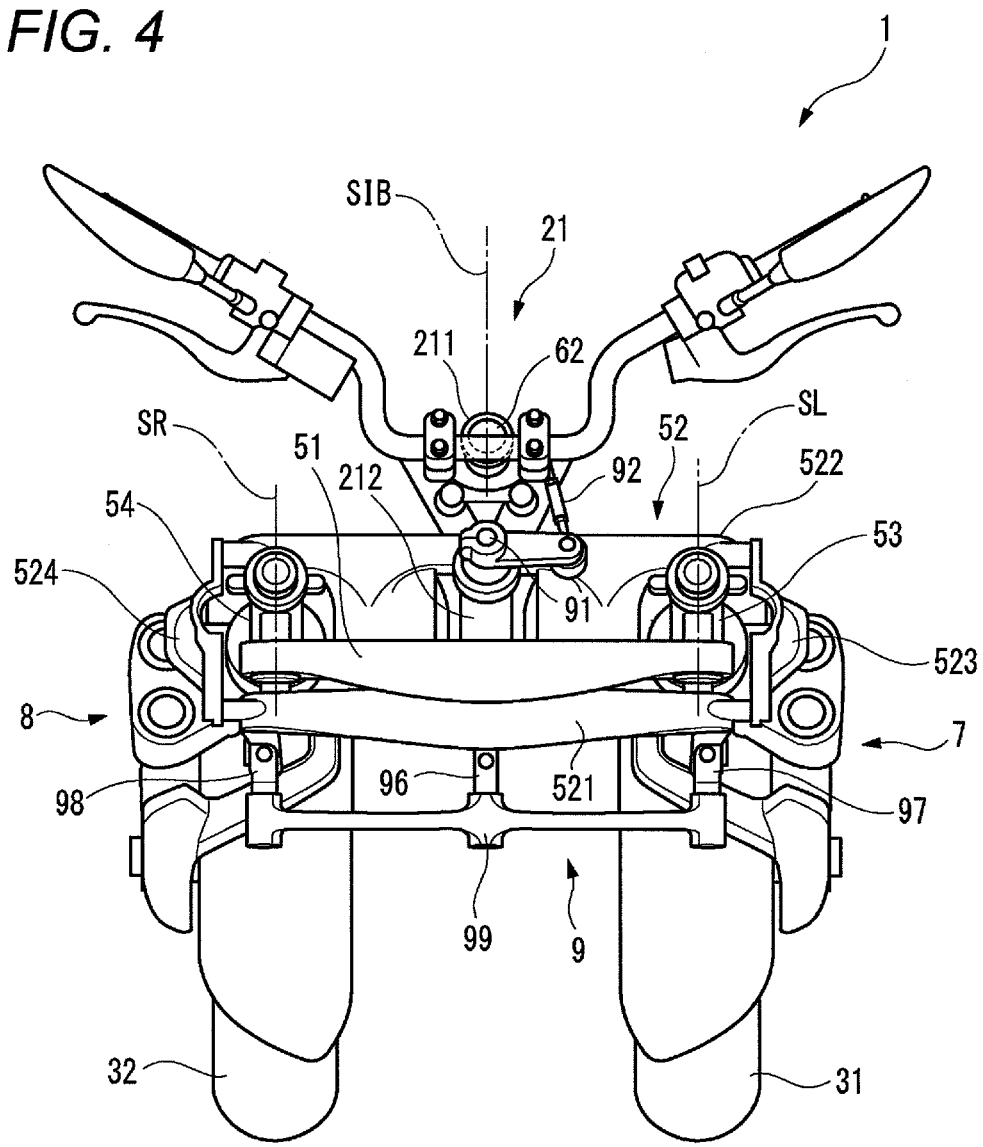
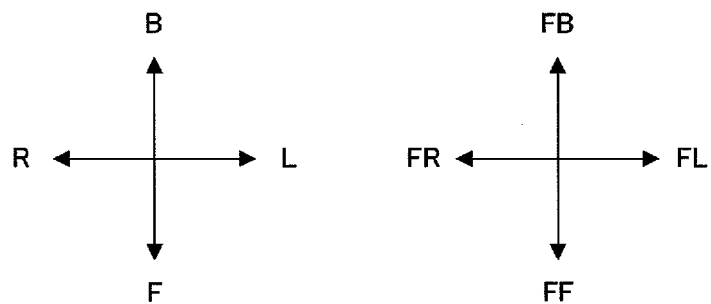

FIG. 10
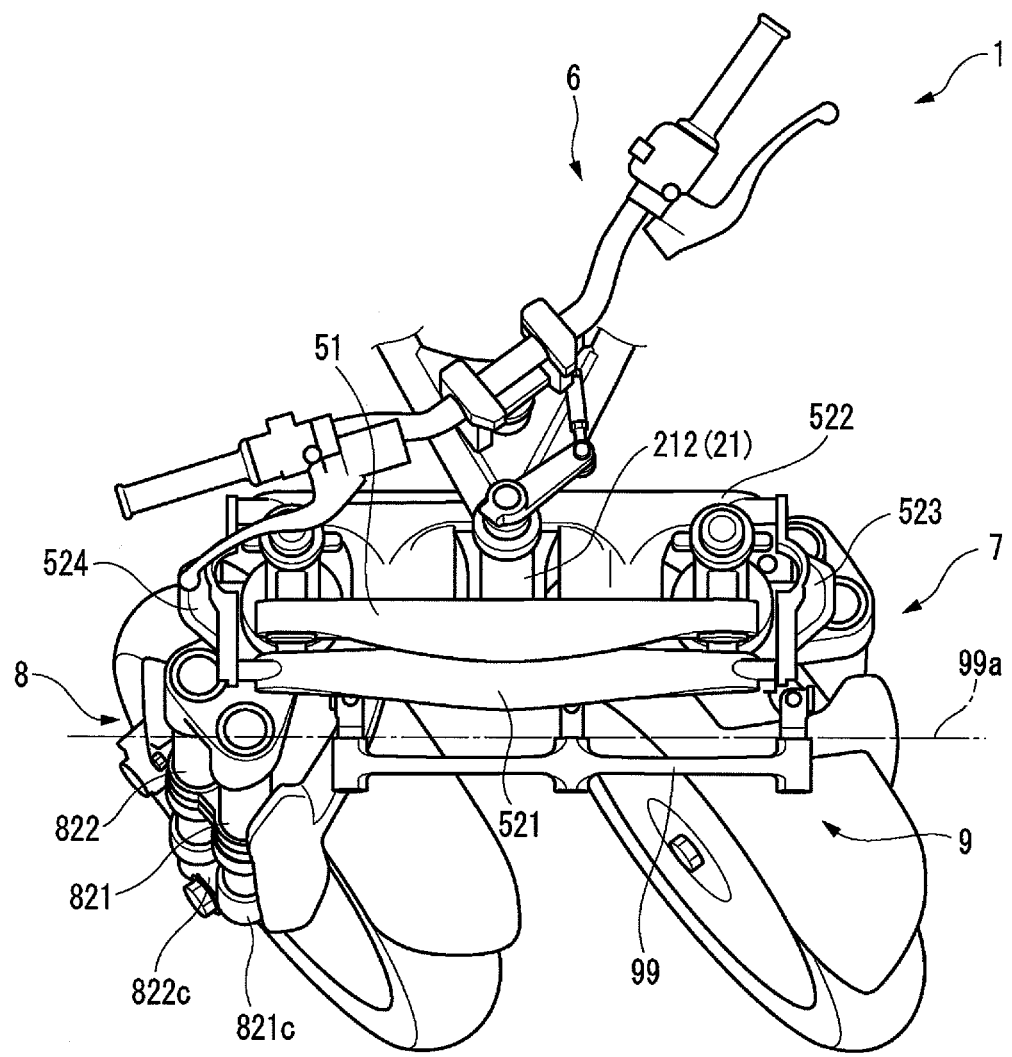
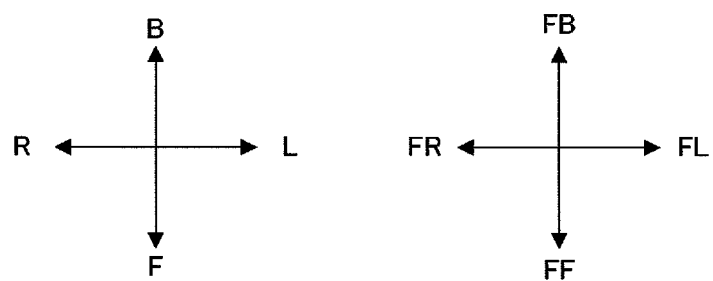

VEHICLE

BACKGROUND OF THE INVENTION

1. Field of the Invention

The present invention relates to a vehicle equipped with a leanable body frame and two front wheels.

2. Description of the Related Art

A vehicle described in, for example, International Patent Publication No. 2014/065396 includes a body frame that leans to the left or right of the vehicle when the vehicle turns left or right and two front wheels that are arranged side by side in a left-right direction of the body frame. This type of vehicle is able to turn with its body frame leaning from a vertical direction. More specifically, the body frame leans to the right of the vehicle when the vehicle turns to the right, while when the vehicle turns to the left, the body frame leans to the left of the vehicle. In this type of vehicle, a distance between the two front wheels which are arranged side by side in the left-right direction of the body frame is very short, compared with a general four-wheeled vehicle. Consequently, this type of vehicle is compact in size in relation to the left-right direction of the body frame.

The vehicle described in International Patent Publication No. 2014/065396 includes a so-called parallelogram type linkage. The parallelogram type linkage can be disposed above the two front wheels. On the other hand, a linkage that is known as a double wishbone type linkage is disposed between the two front wheels in the left-right direction of the body frame. Accordingly, the vehicle equipped with the parallelogram type linkage is more compact in size in relation to the left-right direction of the body frame than the vehicle equipped with the double wishbone type linkage.

The parallelogram type linkage includes an upper cross member, a lower cross member, a left side member and a right side member. The upper cross member, the lower cross member, the left side member and the right side member are connected so that the upper cross member and the lower cross member maintain postures parallel to each other and the left side member and the right side member maintain postures parallel to each other. The upper cross member and the lower cross member are supported on the body frame so as to turn about axes that extend in a front-rear direction of the body frame. The left side member is supported at a left portion of the upper cross member and a left portion of the lower cross member so as to turn abut axes that extend in the front-rear direction of the body frame. The right side member is supported at a right portion of the upper cross member and a right portion of the lower cross member so as to turn about axes that extend in the front-rear direction of the body frame. Namely, the upper cross member, the lower cross member, the left side member and the right side member turn individually about the axes that extend in the front-rear direction of the body frame. Accordingly, movable ranges of the upper cross member, the lower cross member, the left side member and the right side member when the parallelogram type linkage operates are relatively small in relation to a front-rear direction of the vehicle.

The vehicle described in International Patent Publication No. 2014/065396 includes a telescopic suspension. The telescopic suspension includes a left suspension and a right suspension. The left suspension supports one (a left front wheel) of the two front wheels at a lower portion thereof and is supported on the left side member at an upper portion thereof. The left suspension attenuates an upward displacement of the left front wheel in an up-down direction of the body frame relative to the upper portion thereof. The right suspension supports the other (a right front wheel) of the two front wheels at a lower portion thereof and is supported on the right side member at an upper portion thereof. The right suspension attenuates an upward displacement of the right front wheel in the up-down direction of the body frame relative to the upper portion thereof. The telescopic suspension includes an inner tube and an outer tube. The inner tube and the outer tube are displaced relatively along a telescopic axis that extends in the up-down direction of the body frame. Accordingly, movable ranges of the inner tube and the outer tube when the telescopic suspension operates are relatively small in the front-rear direction of the vehicle.

Consequently, the vehicle including the parallelogram type linkage and the telescopic suspension is compact in size in the front-rear direction.

In the vehicle described above, it is desired that a maximum displacement amount (hereinafter, referred to as a stroke) of the suspension is increased. In a case where the inner tube and the outer tube are long in the up-down direction of the body frame, the stroke can be increased accordingly. However, the vehicle is increased in size in the up-down direction.

Additionally, it is desired that a maximum leaning angle (hereinafter, referred to as a maximum banking angle) of the body frame is increased. In a case where a space between a left member that includes the left suspension and the left front wheel and a right member that includes the right suspension and the right front wheel in the left-right direction of the body frame is increased, it becomes difficult for the left member and the right member to interfere with each other even when the body frame is caused to lean. In other words, the maximum banking angle can be increased by increasing the space between the left member and the right member in the left-right direction of the body frame. In a case where the space between the left member and the right member in the left-right direction of the body frame is expanded, however, the space between the left side member that supports the left suspension and the right side member that supports the right suspension in the left-right direction of the body frame is expanded. This increases the size of the vehicle in the left-right direction. In addition, distances from the turning centers of the upper cross member and the lower cross member about which they turn relative to the body frame to the left side member and the right side member become long. Accordingly, the movable range of the linkage becomes wide not only in the left-right direction but also in the up-down direction of the body frame. Consequently, the vehicle is also increased in size in the up-down direction.

SUMMARY OF THE INVENTION

Preferred embodiments of the present invention increase a maximum banking angle and a stroke of a suspension while preventing or significantly reducing enlargement of a vehicle in an up-down direction.

According to a preferred embodiment of the present invention, a vehicle includes a body frame; a left front wheel and a right front wheel that are arranged side by side in a left-right direction of the body frame; a linkage disposed above the left front wheel and the right front wheel in an up-down direction of the body frame, and that changes positions of the left front wheel and the right front wheel relative to the body frame to cause the body frame to lean to left or right of the vehicle; a left telescopic suspension that supports the left front wheel and that attenuates or absorbs a displacement of the left front wheel toward the linkage in the up-down direction of the body frame; and a right telescopic suspension that supports the right front wheel and that attenuates or absorbs a displacement of the right front wheel toward the linkage in the up-down direction of the body frame, wherein the linkage includes an upper cross member; a lower cross member disposed below the upper cross member in the up-down direction of the body frame; a left side member disposed above the left front wheel in the up-down direction of the body frame and that supports the left suspension such that the left suspension is able to turn about a left steering axis extending in the up-down direction of the body frame; a right side member disposed above the right front wheel in the up-down direction of the body frame and that supports the right suspension such that the right suspension is able to turn about a right steering axis extending in the up-down direction of the body frame; the upper cross member, the lower cross member, the left side member and the right side member are connected such that the upper cross member and the lower cross member maintain parallel postures to each other, and such that the left side member and the right side member maintain parallel postures to each other; the left suspension includes a left shock absorber including a left inner portion and a left outer portion that are movable relative to each other along a left telescopic axis extending in the up-down direction of the body frame; and a left turn restrictor including a left guide portion and a left guided portion that are movable relative to each other in a direction parallel to the left telescopic axis and that restrict relative turning of the left inner portion and the left outer portion; one of the left inner portion and the left outer portion supports the left front wheel; the other one of the left inner portion and the left outer portion is supported by the left side member; one of the left guide portion and the left guided portion is connected to the left inner portion; the other one of the left guide portion and the left guided portion is connected to the left outer portion; the right suspension includes a right shock absorber including a right inner portion and a right outer portion that are movable relative to each other along a right telescopic axis extending in the up-down direction of the body frame; and a right turn restrictor including a right guide portion and a right guided portion that are movable relative to each other in a direction parallel to the right telescopic axis and that restrict relative turning of the right inner portion and the right outer portion; one of the right inner portion and the right outer portion supports the right front wheel; the other one of the right inner portion and the right outer portion is supported by the right side member; one of the right guide portion and the right guided portion is connected to the right inner portion; the other one of the right guide portion and the right guided portion is connected to the right outer portion; a distance between the left steering axis and a left end of the lower cross member in the left-right direction of the body frame is shorter than a distance between the left steering axis and the right steering axis in the left-right direction of the body frame when the vehicle in which the body frame is standing upright is viewed from a front in a front-rear direction of the body frame; a distance between the right steering axis and a right end of the lower cross member in the left-right direction of the body frame is shorter than a distance between the left steering axis and the right steering axis in the left-right direction of the body frame when the vehicle in which the body frame is standing upright is viewed from the front in the front-rear direction of the body frame; the left shock absorber is disposed such that the left telescopic axis is positioned on the left of the left steering axis in the left-right direction of the body frame when the vehicle in which the body frame is standing upright is viewed from the front in the front-rear direction of the body frame; and the right shock absorber is disposed such that the right telescopic axis is positioned on the right of the right steering axis in the left-right direction of the body frame when the vehicle in which the body frame is standing upright is viewed from the front in the front-rear direction of the body frame.

A configuration is known in which a recess (a relief portion) that the left shock absorber and the right shock absorber enter is provided in the lower cross member. According to this configuration, enlargement in the size of the vehicle in the up-down direction is prevented while avoiding the interference of the left shock absorber and the right shock absorber with the lower cross member when the body frame leans. However, since the displacement amount of the left shock absorber and the right shock absorber towards the lower cross member increases as the maximum banking angle increases, a deeper recess needs to be provided. This is true when attempting to increase the stroke, too. In order to avoid a reduction in rigidity that would be caused by the recess, the dimension of the lower cross member in the up-down direction of the body frame needs to be increased. As a result, it becomes difficult to prevent enlargement of the size of the vehicle in the up-down direction.

The inventors of preferred embodiments of the present invention conceived that the advantages of preferred embodiments of the present invention described above are able to be achieved by providing the left shock absorber and the right shock absorber in place of the conventional countermeasures regarding the shape of the lower cross member.

In a case where the left shock absorber is disposed so that the left telescopic axis is positioned on the right of the left steering axis in the left-right direction of the body frame and the right shock absorber is disposed so that the right telescopic axis is positioned on the left of the right steering axis in the left-right direction of the body frame when the vehicle in which the body frame is standing upright is viewed from the front in the front-rear direction of the body frame, a portion of the lower cross member where the left shock absorber and the right shock absorber could interfere with the lower cross member is positioned between the left steering axis and the right steering axis when the vehicle in which the body frame is standing upright is viewed from the front in the front-rear direction of the body frame. This portion would be highly related to the rigidity of the lower cross member. In other words, it can be said that this portion has a relatively low degree of freedom in selecting a shape therefor from the viewpoint of ensuring the rigidity.

On the other hand, in a case where the left shock absorber is disposed so that the left telescopic axis is positioned on the left of the left steering axis in the left-right direction of the body frame when the vehicle in which the body frame is standing upright is viewed from the front in the front-rear direction of the body frame, a portion of the lower cross member where the left shock absorber could interfere with the lower cross member is positioned between the left steering axis and the left end of the lower cross member when the vehicle in which the body frame is standing upright is viewed from the front in the front-rear direction of the body frame. Similarly, in a case where the right shock absorber is disposed so that the right telescopic axis is positioned on the right of the right steering axis in the left-right direction of the body frame when the vehicle in which the body frame is standing upright is viewed from the front in the front-rear direction of the body frame, a portion of the lower cross member where the right shock absorber could interfere with the lower cross member is positioned between the right steering axis and the right end of the lower cross member when the vehicle in which the body frame is standing upright is viewed from the front in the front-rear direction of the body frame. These portions are portions that would be less related to the rigidity of the lower cross member. In other words, it can be said that these portions have a relatively high degree of freedom in selecting shapes therefor from the viewpoint of ensuring the rigidity of the lower cross member.

The inventors of preferred embodiments of the present invention conceived that it would be advantageous to dispose the left shock absorber and the right shock absorber in the position where the left shock absorber and the right shock absorber could interfere with the portions that would be relatively less related to the rigidity of the lower cross member and which have relatively high degree of freedom in selecting the shapes of the portions from the viewpoint of ensuring the rigidity of the lower cross member.

Based on the considerations described above, the left rear telescopic element that defines the left shock absorber is disposed so that the left telescopic axis is positioned on the left of the left steering axis in the left-right direction of the body frame when the vehicle in which the body frame is standing upright is viewed from the front in the front-rear direction of the body frame. On the other hand, the right rear telescopic element that defines the right shock absorber is disposed so that the right telescopic axis is positioned on the right of the right steering axis in the left-right direction of the body frame. This configuration is advantageous in the following points.

Firstly, the left shock absorber moves away from the portion that is positioned between the left steering axis and the left end of the lower cross member as the vehicle leans to the left. On the other hand, the right shock absorber moves towards the portion that is between the right steering axis and the right end of the lower cross member. Since the portion positioned on the right of the right steering axis has a high degree of freedom of space, however, the shape and arrangement of the right suspension is easily selected as to avoid the interference of both members. Accordingly, it is easy to shorten the distance between the right shock absorber and the lower cross member in the up-down direction of the body frame. Similarly, the right shock absorber moves away from the portion that is between the right steering axis and the right end of the lower cross member as the vehicle leans to the right. On the other hand, the left shock absorber moves towards the portion that is between the left steering axis and the left end of the lower cross member. Since the portion positioned on the left of the left steering axis has a high degree of freedom of space, however, the shape and arrangement of the left suspension is easily selected as to avoid the interference of both members. Accordingly, it is easy to shorten the distance between the left shock absorber and the lower cross member in the up-down direction of the body frame.

Secondly, even though a recess where a portion of the left suspension is able to enter is provided in the portion that is positioned between the left steering axis and the left end of the lower cross member in order to avoid the interference of the left suspension with the lower cross member, a possible reduction in the rigidity of the lower cross member is kept to a minimum. Similarly, even though a recess where a portion of the right suspension is able to enter is provided in the portion that is positioned between the right steering axis and the right end of the lower cross member in order to avoid the interference of the right suspension with the lower cross member, a possible reduction in the rigidity of the lower cross member is kept to a minimum.

Thirdly, since the dimension of the lower cross member in the up-down direction of the body frame does not have to be increased, a distance between the upper cross member and the lower cross member in the up-down direction of the body frame that avoids interference therebetween is shortened.

Even though the maximum banking angle and the stroke of the suspensions are increased, enlargement in the size of the vehicle in the up-down direction is prevented by the synergistic action of the first advantageous effect, the second advantageous effect and the third advantageous effect.

In connection with the first advantageous effect, the above vehicle is preferably configured as follows. The lower cross member is axisymmetric with a left edge of the left suspension relative to the left steering axis when the vehicle in which the body frame is caused to lean to the left at a maximum angle. The lower cross member is axisymmetric with a right edge of the right suspension relative to the right steering axis when the vehicle in which the body frame is caused to lean to the right at a maximum angle.

The axisymmetric position corresponds to a location where the right end of the left suspension is positioned when the vehicle is caused to lean to the left with the maximum angle at which the left shock absorber is disposed on the right of the left steering axis in the left-right direction of the body frame. Namely, this means that the lower cross member interferes with the left suspension. To avoid the interference, the left suspension that supports the left shock absorber needs to be disposed below the left suspension, and enlargement in the size of the vehicle in the up-down direction of the body frame cannot be avoided. According to the configuration of this preferred embodiment, when the vehicle leans to the left, the left end portion of the lower cross member and the left shock absorber move way from each other. On the other hand, since the portion positioned directly on the right of the right steering axis has a high degree of freedom of space, it is easy to avoid the interference of the right end portion of the lower cross member with the right shock absorber. Consequently, it is easy to reduce the distance between the lower cross member and the left shock absorber in the up-down direction of the body frame.

The axisymmetric position corresponds to a location where a left end of the right suspension is positioned when the vehicle is caused to lean to the right at the maximum angle at which the right shock absorber is disposed on the left of the right steering axis in the left-right direction of the body frame. Namely, this means that the lower cross member interferes with the right suspension. To avoid the interference, the right suspension that supports the right shock absorber is disposed below the right suspension, and enlargement in the size of the vehicle in the up-down direction of the body frame cannot be avoided. According to the configuration of this preferred embodiment, when the vehicle leans to the right, the right end portion of the lower cross member and the right shock absorber move way from each other. On the other hand, since the portion positioned directly on the left of the left steering axis has a high degree of freedom of space, it is easy to avoid the interference of the left end portion of the lower cross member with the left shock absorber. Consequently, it is easy to reduce the distance between the lower cross member and the right shock absorber in the up-down direction of the body frame.

The above vehicle is preferably configured as follows. A left portion of the lower cross member is supported on a lower portion of the left side member such that the left portion of the lower cross member is able to turn about a lower left connecting axis extending in the front-rear direction of the body frame. A right portion of the lower cross member is supported on a lower portion of the right side member such that the right portion of the lower cross member is able to turn about a lower right connecting axis extending in the front-rear direction of the body frame. The lower cross member includes a left recess at a left peripheral edge that is positioned on the left of the lower left connecting axis in the left-right direction of the body frame. The lower cross member includes a right recess at a right peripheral edge that is positioned on the right of the lower right connecting axis in the left-right direction of the body frame. A portion of the right suspension is able to enter the right recess at least when the body frame is caused to lean from an upright state thereof to the left of the vehicle at a maximum angle. A portion of the left suspension is able to enter the left recess at least when the body frame is caused to lean from the upright state thereof to the right of the vehicle at a maximum angle.

According to the configuration described above, even though the left recess avoids interference of the lower cross member with a portion of the left suspension, and the right recess avoids interference of the lower cross member with a portion of the right suspension, any influence that would reduce the rigidity of the lower cross member is prevented. Consequently, since a large contribution to the second advantageous effect and the third advantageous effect is obtained, enlargement in the size of the vehicle in the up-down direction is prevented even though the maximum banking angle and the stroke of the suspensions are increased.

In this case, the above vehicle is preferably configured as follows. An upper end of the left recess and an upper end of the right recess in the up-down direction of the body frame is positioned above a straight line connecting the lower left connecting axis and the lower right connecting axis in the up-down direction of the body frame.

The left recess is provided on the left peripheral edge of the lower cross member, and the right recess is provided on the right peripheral edge of the lower cross member. Accordingly, although the depth over which the left turn restrictor and the right turn restrictor enter is increased by setting the positions of the upper end of the left recess and the upper end of the right recess in the manner described above, any influence that would reduce the rigidity of the lower cross member is prevented. Consequently, since a large contribution to the second advantageous effect and the third advantageous effect is obtained, enlargement in the size of the vehicle in the up-down direction is prevented even though the maximum banking angle and the stroke of the suspensions are increased.

The above vehicle is preferably configured so as to include a steering member that is able to turn about a turn axis relative to the body frame; and a steering force transmission that causes the left suspension and the right suspension to turn in a direction that the steering member is turned.

The above vehicle is preferably configured as follows. The portion of the left suspension in the left recess is movable within the left recess in accordance with the turning of the left suspension about the left steering axis. The left recess is configured such that a movable amount of the portion of the left suspension within the left recess is reduced as a leaning angle of the body frame to the right of the vehicle increases. The portion of the right suspension in the right recess is movable within the right recess in accordance with the turning of the right suspension about the right steering axis. The right recess is configured such that a movable amount of the portion of the right suspension within the right recess is reduced as a leaning angle of the body frame to the left of the vehicle increases.

Namely, the mechanism that restricts the turning angle of the steering member according to the leaning angle of the body frame is provided by making use of the portion where the degree of freedom in selecting the shape is relatively high from the viewpoint of ensuring the rigidity of the lower cross member. In other words, the mechanism does not have to be provided in the location between the left steering axis and the right steering axis of the lower cross member, that is, the portion that is related to ensuring the rigidity of the lower cross member. Consequently, even though the maximum banking angle and the stroke of the suspensions are increased, not only is enlargement in the size of the vehicle in the up-down direction prevented, but also a countermeasure to enhance the rigidity of the lower cross member is easily provided.

In this case, the above vehicle is preferably configured as follows. The lower cross member includes a front element disposed ahead of the left side member and the right side member in the front-rear direction of the body frame; a rear element disposed behind of the left side member and the right side member in the front-rear direction of the body frame; a left connecting member connecting a left end portion of the front element and a left end portion of the rear element; and a right connecting member connecting a right end portion of the front element and a right end portion of the rear element. The left recess is defined by the left connecting member. The right recess is defined by the right connecting member.

According to the configuration described above, the left recess having the desired shape is easily defined by the left connecting member that is separate from the front element and the rear element. Similarly, the right recess having the desired shape is easily defined by the right connecting member that is separate from the front element and the rear element. Consequently, even though the maximum banking angle and the stroke of the suspensions are increased, not only is enlargement in the size of the vehicle in the up-down direction prevented, but also the mechanism that restricts the turning angle of the steering member according to the leaning angle of the body frame is easily provided.

The above vehicle is preferably configured as follows. A left portion of the lower cross member is supported on a lower portion of the left side member such that the left portion of the lower cross member is able to turn about a lower left connecting axis extending in the front-rear direction of the body frame. A right portion of the lower cross member is supported on a lower portion of the right side member such that the right portion of the lower cross member is able to turn about a lower right connecting axis extending in the front-rear direction of the body frame. An upper edge of the lower cross member includes a portion positioned above a lower edge of the upper cross member in a vertical direction when the body frame is caused to lean from an upright state thereof to the left or the right of the vehicle at a maximum leaning angle, and viewed from a direction along the lower left connecting axis and the lower right connecting axis.

By defining the positional relationship between the upper edge of the lower cross member and the lower edge of the upper cross member in the manner described above, enlargement in the size of the linkage in relation to the up-down direction of the body frame is prevented. Consequently, even though the maximum banking angle and the stroke of the suspensions are increased, enlargement in the size of the vehicle in the up-down direction is further prevented.

The above vehicle is preferably configured as follows. A left portion of the lower cross member is supported on a lower portion of the left side member such that the left portion of the lower cross member is able to turn about a lower left connecting axis extending in the front-rear direction of the body frame. A right portion of the lower cross member is supported on a lower portion of the right side member such that the right portion of the lower cross member is able to turn about a lower right connecting axis extending in the front-rear direction of the body frame. When the body frame is caused to lean from an upright state thereof to the left or the right of the vehicle at a maximum leaning angle, a turn angle of the lower cross member about the lower left connecting axis and the lower right connecting axis is smaller than the maximum leaning angle.

According to this configuration, the movable range of the linkage in the up-down direction of the body frame is reduced. Consequently, even though the maximum banking angle and the stroke of the suspensions are increased, enlargement in the size of the vehicle in the up-down direction is further prevented.

The above vehicle is preferably configured as follows. The left front wheel is disposed on the right of the left shock absorber in the left-right direction of the body frame. The right front wheel is disposed on the left of the right shock absorber in the left-right direction of the body frame.

Namely, the left front wheel and the right front wheel are disposed between the left shock absorber and the right shock absorber. According to this configuration, even though the maximum banking angle and the stroke of the suspensions are increased, not only is enlargement in the size of the vehicle in the up-down direction prevented, but also enlargement in the size of the vehicle in the left-right direction is prevented.

In this case, the above vehicle is preferably configured as follows. The left front wheel is disposed on the right of the left turn restrictor in the left-right direction of the body frame. The right front wheel is disposed on the left of the right turn restrictor in the left-right direction of the body frame.

Namely, the left front wheel and the right front wheel are disposed between the left shock absorber, the left turn restrictor, the right shock absorber and the right turn restrictor. According to this configuration, even though the maximum banking angle and the stroke of the suspensions are increased, not only is enlargement in the size of the vehicle in the up-down direction prevented, but also enlargement in the size of the vehicle in the left-right direction is further prevented.

The above vehicle preferably includes a steering member that is able to turn about a turn axis relative to the body frame; and a steering force transmission that causes the left suspension and the right suspension to turn in a direction that the steering member is turned. The above vehicle is preferably configured as follows. The steering force transmission includes an intermediate turning portion that is able to turn about an intermediate steering axis in accordance with the turning of the steering member; a left turning portion disposed directly on the left of the intermediate turning portion in the left-right direction of the body frame, and connected to the left suspension so as to be able to turn about the left steering axis; a right turning portion disposed directly on the right of the intermediate turning portion in the left-right direction of the body frame, and connected to the right suspension so as to be able to turn about the right steering axis; and a connector connecting the intermediate turning portion with the left turning portion and the right turning portion. At least one of a front end of the left shock absorber and a front end of the left turn restrictor is positioned ahead of a rear end of the connector in the front-rear direction of the body frame when the steering member is turned clockwise, as viewed by a rider, at a maximum angle. At least one of a front end of the right shock absorber and a front end of the right turn restrictor is positioned ahead of the rear end of the connector in the front-rear direction of the body frame when the steering member is turned counterclockwise, as viewed by the rider, at a maximum angle.

According to this configuration, since the necessity of considering the avoidance of the interference of the lower cross member with the left suspension and the right suspension is reduced, it is possible to prevent enlargement in the size of the steering force transmission in relation to the front-rear direction of the body frame. Even though the maximum banking angle and the stroke of the suspensions are increased, not only is enlargement in the size of the vehicle in the up-down direction prevented, but also enlargement in the size of the vehicle in the front-rear direction is prevented.

The above vehicle is preferably configured as follows. A left portion of the lower cross member is supported on a lower portion of the left side member such that the left portion of the lower cross member is able to turn about a lower left connecting axis extending in the front-rear direction of the body frame. A right portion of the lower cross member is supported on a lower portion of the right side member such that the right portion of the lower cross member is able to turn about a lower right connecting axis extending in the front-rear direction of the body frame. A lower edge of the lower cross member that is positioned between the lower left connecting axis and the lower right connecting axis is positioned below a straight line connecting the lower left connecting axis and the lower right connecting axis in the up-down direction of the body frame when the vehicle in which the body frame is standing upright is viewed from a direction along the lower left connecting axis and the lower right connecting axis.

According to this configuration, even though a relief portion where the lower edge of the lower cross member is recessed upwards with a large extent is not provided between the lower left connecting axis and the lower right connecting axis, it is possible to avoid the interference of the lower cross member with a portion of the left suspension and a portion of the right suspension. By using this configuration, the rigidity of the lower cross portion is enhanced. In other words, the dimension of the lower cross member in the up-down direction of the body frame does not have to be increased in order to ensure the rigidity thereof. Consequently, even though the maximum banking angle and the stroke of the suspensions are increased, enlargement in the size of the vehicle in the up-down direction is prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a plan view showing the front portion of the vehicle of FIG. 1.

FIG. 10 is a plan view showing the front portion of the vehicle of FIG. 1 when steering is performed.

DETAILED DESCRIPTION OF THE PREFERRED EMBODIMENTS

Figure 1:
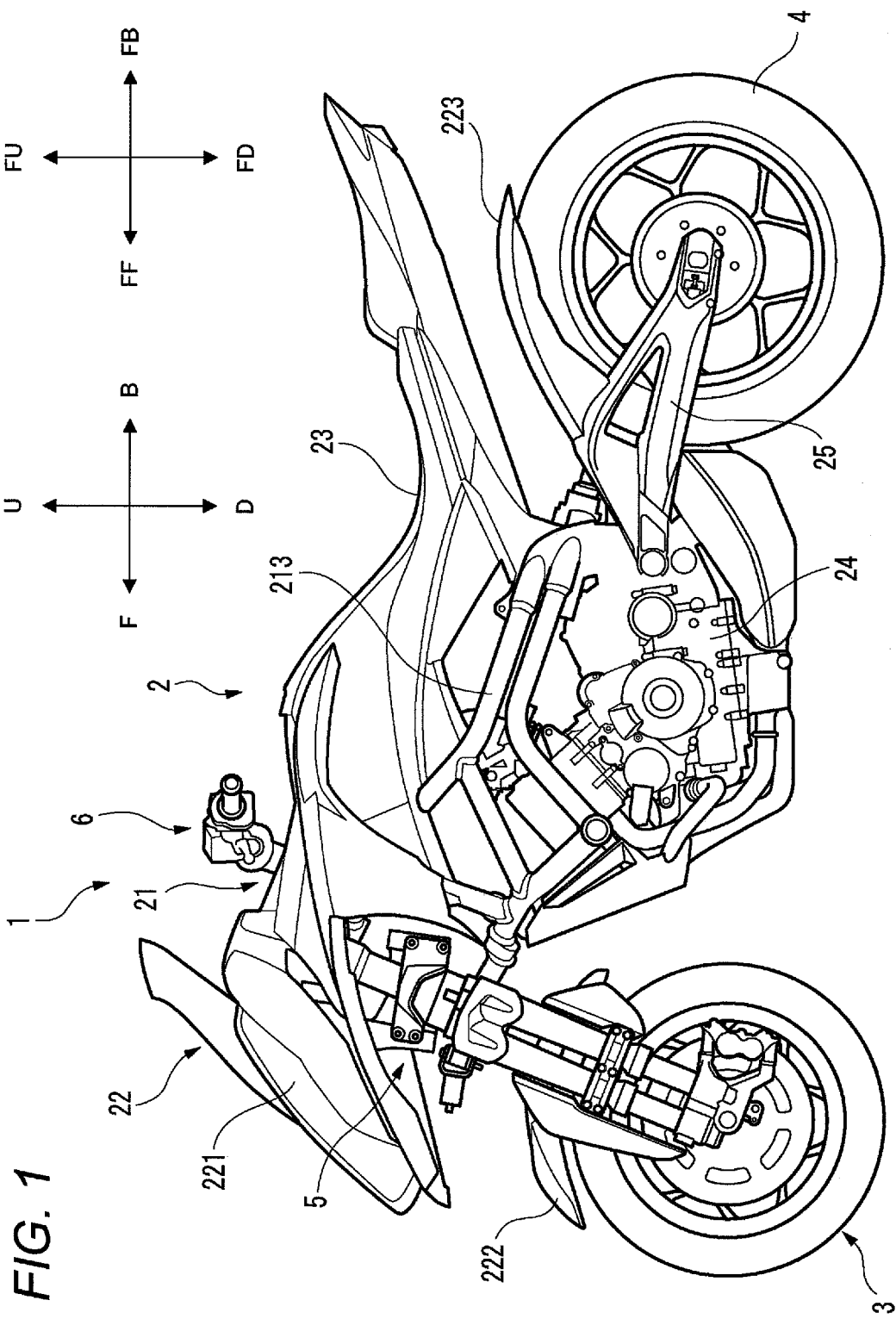
FIG. 1 is a left side view showing an entire vehicle according to a preferred embodiment of the present invention.

Referring to the accompanying drawings, exemplary preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame being caused to lean to the left or right of the vehicle from a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed by a rider who rides the vehicle. "A side of or sideways of the body frame" means directly on the right or left in the left-right direction of the body frame.

In this description, an expression "extending in the front-rear direction of the vehicle body frame" includes a fact that it extends while being inclined in relation to the front-rear direction of the vehicle body frame and means that it extends in a direction closer to the front-rear direction of the vehicle body frame than the left-right direction and up-down direction of the vehicle body frame.

In this description, an expression "extending in the left-right direction of the vehicle body frame" includes a fact that it extends while being inclined in relation to the left-right direction of the vehicle body frame and means that it extends in a direction closer to the left-right direction of the vehicle body frame than the front-rear direction and up-down direction of the vehicle body frame.

In this description, an expression "extending in the up-down direction of the vehicle body frame" includes a fact that it extends while being inclined in relation to the up-down direction of the vehicle body frame and means that it extends in a direction closer to the up-down direction of the vehicle body frame than the left-right direction and front-rear direction of the vehicle body frame.

In this description, an expression reading the "vehicle is standing upright or in an upright state" or the "body frame is standing upright or in the upright state" means a state in which the vehicle is not steered at all and the up-down direction of the body frame coincides with the vertical direction. In this state, the directions based on the vehicle coincide with the directions based on the body frame. When the vehicle is turning with the body frame caused to lean to the left or right from the vertical direction, the left-right direction of the vehicle does not coincide with the left-right direction of the body frame. Similarly, the up-down direction of the vehicle does not coincide with the up-down direction of the body frame. However, the front-rear direction of the vehicle coincides with the front-rear direction of the body frame.

In this description, an expression reading "directly on the left of a member A in the left-right direction of the body frame" denotes a space through which the member A passes when the member A is translated to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is translated to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is translated upwards in the up-down direction of the body frame. An expression reading "directly below the member A" is also defined in the same way.

In this description, an expression reading "above the member A in the up-down direction of the body frame" includes not only the space through which the member A passes when the member A is translated upwards in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is translated to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is translated to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

Referring to FIGS. 1 to 12, a vehicle 1 according to preferred embodiments of the present invention will be described. As shown in FIG. 1, the vehicle 1 includes a vehicle main body 2, two front wheels 3, a rear wheel 4, a linkage 5 and a steering member 6. The vehicle 1 includes a leanable body frame and the two front wheels 3 arranged side by side in the left-right direction of the body frame.

The vehicle main body 2 includes a body frame 21, a body cover 22, a seat 23, an engine unit 24, and a rear arm 25.

In FIG. 1, the body frame 21 is in the upright state. The following description to be made while referring to FIG. 1 is based on the premise that the body frame 21 is in the upright state. FIG. 1 is a left side view resulting when the entire vehicle 1 is viewed from the left in the left-right direction of the body frame 21.

Figure 2:
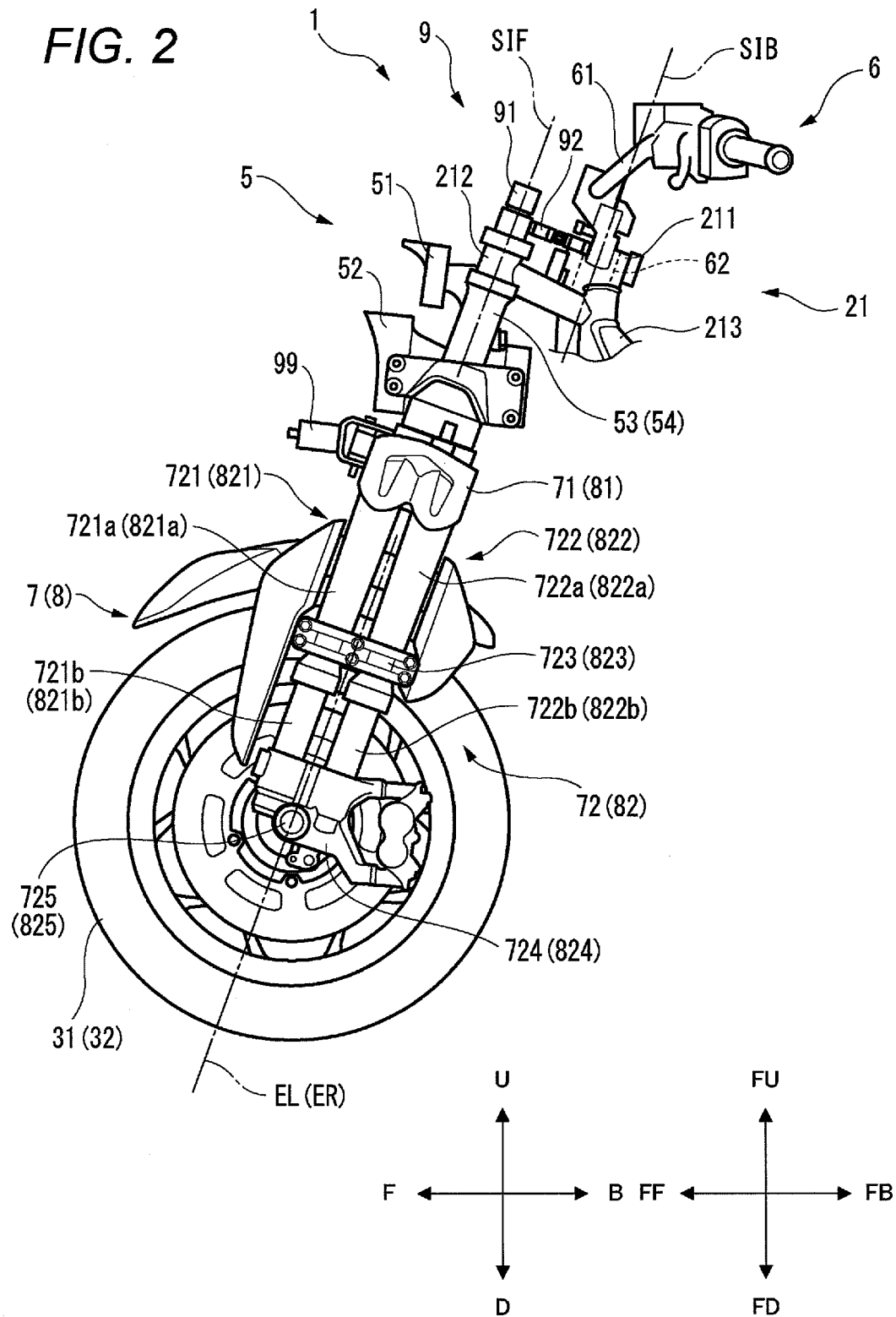
FIG. 2 is a left side view showing a front portion of the vehicle of FIG. 1 in an enlarged manner.

FIG. 2 is a view resulting when a front portion of the vehicle 1 is viewed from the left in the left-right direction of the body frame 21. In FIG. 2, the body frame 21 is in the upright state. The following description to be made while referring to FIG. 2 is based on the premise that the body frame 21 is in the upright state.

The body frame 21 includes a head pipe 211, a link support 212 and a main frame 213. The head pipe 211 supports the steering member 6. The link support 212 supports the linkage 5. The main frame 213 supports the seat 23, the engine unit 24 and the rear arm 25.

The rear arm 25 is disposed directly behind the main frame 213 in the front-rear direction of the body frame 21. The rear arm 25 extends in the front-rear direction of the body frame 21. A front end portion of the rear arm 25 is supported by the main frame 213 and the engine unit 24 and is able to turn about an axis that extends in the left-to-rear direction of the body frame 21. A rear end portion of the rear arm 25 supports the rear wheel 4.

The body cover 22 is a body portion that covers at least portions of a group of constituent elements that define the vehicle 1. The body cover 22 includes a front cover 221, a pair of left and right front fenders 222 and a rear front fender 223.

As shown in FIG. 1, the front cover 221 is disposed directly ahead of the seat 23 in the front-rear direction of the body frame 21. The front cover 221 covers the linkage 5, the steering member 6 and at least a portion of a steering force transmission 9. The front cover 221 is not movable relative to the body frame 21. In FIG. 2, the front cover 221 is omitted from the illustration.

At least portions of the pair of left and right front fenders 222 are separately disposed directly below the front cover 221. At least portions of the pair of left and right front fenders 222 are disposed directly above the pair of left and right front wheels 3, respectively.

At least a portion of the rear wheel 4 is disposed below the seat 23 in the up-down direction of the body frame 21. At least a portion of the rear wheel 4 is disposed directly below the rear front fender 223 in the up-down direction of the body frame 21.

The vehicle 1 according to the present preferred embodiment is a vehicle on which a rider mounts in a posture of straddling the body frame 21. Namely, when riding the vehicle 1, a portion of the body frame 21, which is disposed ahead of the seat 23 on which the rider sits in the front-rear direction of the body frame 21, is disposed between the legs of the rider. The rider rides on the vehicle 1 in a posture of holding the main frame 213 or the front cover 221 that is positioned ahead of the seat 23 in the front-rear direction of the body frame 21 by the legs therebetween.

When viewing the vehicle 1 from the left-right direction of the body frame 21, the engine unit 24 is disposed ahead of a front end of the rear wheel 4 in the front-rear direction of the body frame 21. The engine unit 24 is not movable relative to the body frame 21. The engine unit 24 is not movable relative to the main frame 213. The engine 24 produces power to drive the vehicle 1. The driving force so produced is transmitted to the rear wheel 4.

The head pipe 211 is disposed at a front portion of the vehicle 1. When viewing the vehicle 1 from the left in the left-right direction of the body frame 21, an upper portion of the head pipe 211 is disposed behind a lower portion of the head pipe 211 in the front-rear direction of the body frame 21.

The steering member 6 includes a handlebar 61 and an upstream steering shaft 62. The upstream steering shaft 62 extends downwards from a central portion of the handlebar 61 in the left-right direction. The upstream steering shaft 62 is supported on the head pipe 211 so as to turn about a rear intermediate steering axis SIB.

The link support 212 is disposed directly ahead of the head pipe 211 in the front-rear direction of the body frame 21. When viewing the vehicle 1 from the left in the left-right direction of the body frame 21, an upper portion of the link support 212 is disposed behind a lower portion of the link support 212 in the front-rear direction of the body frame 21.

Figure 3:
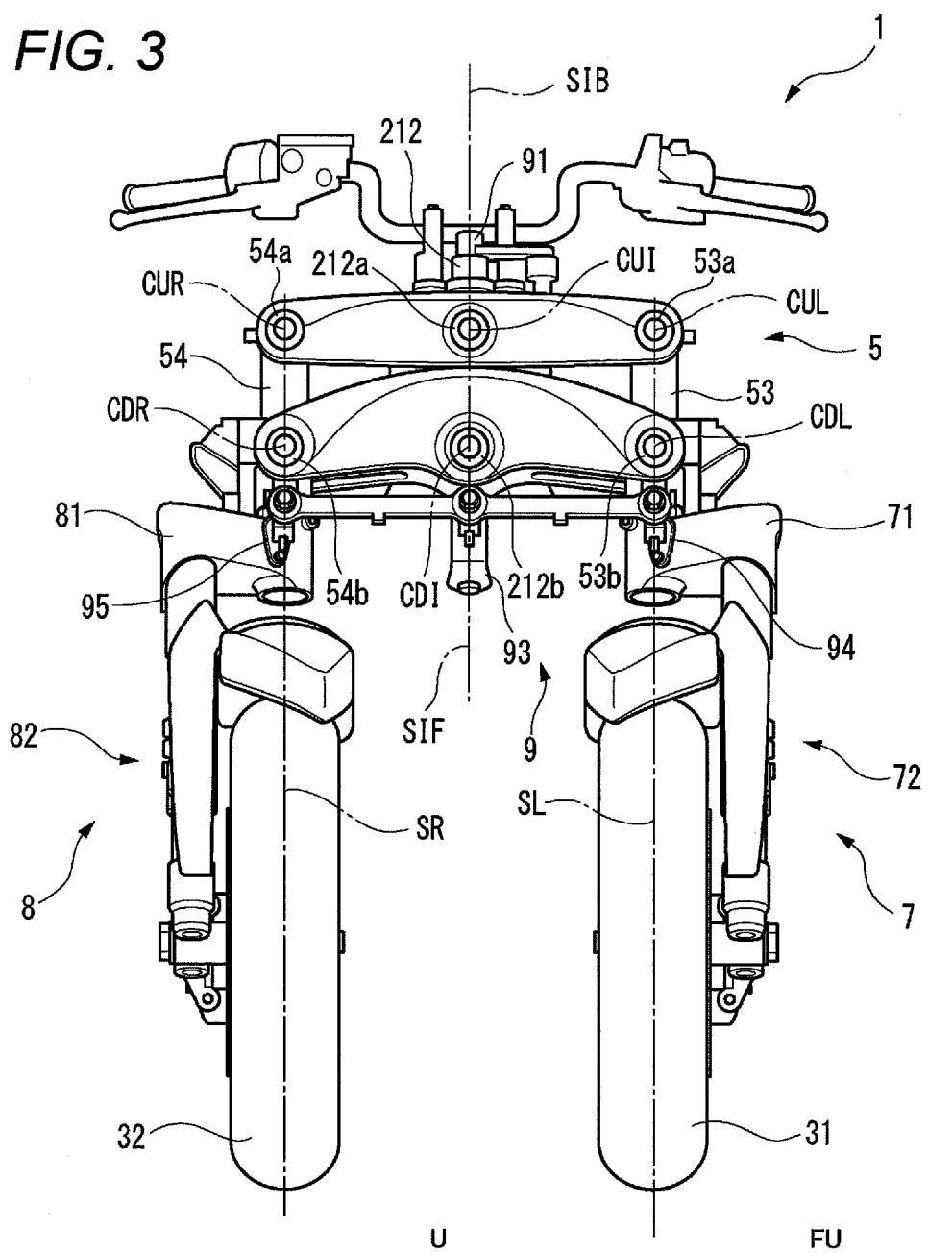
FIG. 3 is a front view showing the front portion of the vehicle of FIG. 1.

FIG. 3 is a front view of the front portion of the vehicle 1 resulting when viewed from the front in the front-rear direction of the body frame 21. In FIG. 3, the body frame 21 is in the upright state. The following description to be made while referring to FIG. 3 is based on the premise that the body frame 21 is in the upright state. In FIG. 3, the front cover 221 is omitted from illustration.

The two front wheels 3 include a left front wheel 31 and a right front wheel 32. The left front wheel 31 is disposed on the left of the head pipe 211 and the link support 212 which defines a portion of the body frame 21 in the left-right direction of the body frame 21. The right front wheel 32 is disposed on the right of the head pipe 211 and the link support 212 which define a portion of the body frame 21 in the left-right direction of the body frame 21. The left front wheel 31 and the right front wheel 32 are arranged side by side in the left-right direction of the body frame 21.

In the vehicle 1 according to this preferred embodiment, the linkage 5 preferably uses a four parallel joint link system (also referred to as a parallelogram link).

The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the upstream steering shaft 62 about the rear intermediate steering axis SIB which occurs in association with the operation of the handlebar 61. Namely, the linkage 5 does not turn about the rear intermediate steering axis SIB relative to the body frame 21.

The link support 212 includes an upper intermediate connector 212a. An intermediate portion of the upper cross member 51 is supported on the link support 212 via the upper intermediate connector 212a. The upper cross member 51 is able to turn relative to the link support 212 about an upper intermediate connecting axis CUI that passes the upper intermediate connector 212a and extends in the front-rear direction of the body frame 21.

The link support 212 includes a lower intermediate connector 212b. An intermediate portion of the lower cross member 52 is supported on the link support 212 via the lower intermediate connector 212b. The lower cross member 52 is able to turn relative to the link support 212 about a lower intermediate connecting axis CDI that passes the lower intermediate connector 212b and extends in the front-rear direction of the body frame 21.

The left side member 53 includes an upper left connector 53a. A left end portion of the upper cross member 51 is connected to the left side member 53 via the upper left connector 53a. The upper cross member 51 is able to turn relative to the left side member 53 about an upper left connecting axis CUL that passes the upper left connecting 53a and which extends in the front-rear direction of the body frame 21.

The right side member 54 includes an upper right connector 54a. A right end portion of the upper cross member 51 is connected to the right side member 54 via the upper right connector 54a. The upper cross member 51 is able to turn relative to the right side member 54 about an upper right connecting axis CUR that passes the upper right connector 54a and which extends in the front-rear direction of the body frame 21.

The left side member 53 includes a lower left connector 53b. A left end portion of the lower cross member 52 is connected to the left side member 53 via the lower left connector 53b. The lower cross member 52 is able to turn relative to the left side member 53 about a lower left connecting axis CDL that passes the lower left connecting 53b and which extends in the front-rear direction of the body frame 21.

The right side member 54 includes a lower right connector 54b. A right end portion of the lower cross member 52 is connected to the right side member 54 via the lower right connector 54b. The lower cross member 52 is able to turn relative to the right side member 54 about a lower right connecting axis CDR that passes the lower right connector 54b and which extends in the front-rear direction of the body frame 21.

FIG. 4 is a plan view of the front portion of the vehicle 1 when viewed from above in the up-down direction of the body frame 21. In FIG. 4, the body frame 21 is in the upright state. The following description to be made while referring to FIG. 4 is based on the premise that the body frame 21 is in the upright state. In FIG. 4, the front cover 221 is omitted from illustration.

The upper cross member 51 is disposed ahead of the link support 212 in the front-rear direction of the body frame 21. The upper cross member 51 is a plate member that extends in the left-right direction of the body frame 21 without being curved in the front-rear direction of the body frame 21.

As shown in FIGS. 2 and 4, the lower cross member 52 is disposed below the upper cross member 51 in the up-down direction of the body frame 21. The lower cross member 52 includes a front element 521 and a rear element 522. The front element 521 is disposed ahead of the link support 212, the left side member 53 and the right side member 54 in the front-rear direction of the body frame 21. The rear element 522 is disposed behind the link support 212, the left side member 53 and the right side member 54 in the front-rear direction of the body frame 21. The front element 521 and the rear element 522 extend in the left-right direction of the body frame 21 without being curved in the front-rear direction of the body frame 21.

As shown in FIG. 4, the lower cross member 52 includes a left connecting member 523 and a right connecting member 524. The left connecting member 523 connects a left end portion of the front element 521 and a left end portion of the rear element 522 together. The right connecting member 524 connects a right end portion of the front element 521 and a right end portion of the rear element 522.

As shown in FIGS. 3 and 4, the left side member 53 is disposed directly on the left of the link support 212 in the left-right direction of the body frame 21. The left side member 53 is disposed above the left front wheel 31 in the up-down direction of the body frame 21. The left side member 53 extends in a direction in which the link support 212 extends. An upper portion of the left side member 53 is disposed behind a lower portion thereof in the front-rear direction of the body frame 21.

As shown in FIGS. 3 and 4, the right side member 54 is disposed directly on the right of the link support 212 in the left-right direction of the body frame 21. The right side member 54 is disposed above the right front wheel 32 in the up-down direction of the body frame 21. The right side member 54 extends in the direction in which the link support 212 extends. An upper portion of the right side member 54 is disposed behind a lower portion thereof in the front-rear direction of the body frame 21.

The upper cross member 51, the lower cross member 52, the left side member 53 and the right side member 54 are supported on the link support 212 so that the upper cross member 51 and the lower cross member 52 maintain postures that are parallel to each other and the left side member 53 and the right side member 54 maintain postures that are parallel to each other.

As shown in FIGS. 2 to 4, the vehicle 1 includes a left suspension 7. The left suspension 7 includes a left bracket 71 and a left shock absorber 72.

The left bracket 71 includes a left turning member, not shown, that is provided at an upper portion thereof. The left turning member is disposed in an interior of the left side member 53 and extends in the same orientation as the direction in which the left side member 53 extends. The left turning member is able to turn about a left steering axis SL relative to the left side member 53. Namely, the left bracket 71 is connected to the left side member 53 so as to turn about the left steering axis SL. The left steering axis SL extends in the direction in which the left side member 53 extends. As shown in FIG. 3, the left steering axis SL extends parallel to the rear intermediate steering axis SIB of the upstream steering shaft 62 in the up-down direction of the body frame 21. As shown in FIG. 4, the left steering axis SL extends parallel to the rear intermediate steering axis SIB of the upstream steering shaft 62 in the up-down direction of the body frame 21.

The left shock absorber 72 is preferably a so-called telescopic shock absorber. The left shock absorber 72 attenuates or absorbs a displacement of the left front wheel 31 towards the linkage 5 in the up-down direction of the body frame 21. As shown in FIG. 2, the left shock absorber 72 includes a left front telescopic element 721, a left rear telescopic element 722, a left upper connecting member 723, a left lower connecting member 714 and a left axle 725.

The left front telescopic element 721 includes a left front outer tube 721a (an example of a left guide portion) and a left front inner tube 721b (an example of a left guided portion). An outer diameter of the left front outer tube 721a is greater than an outer diameter of the left front inner tube 721b. The left front outer tube 721a is supported by the left bracket 71. The left front inner tube 721b is connected to the left front outer tube 721a so as to slide along a left telescopic axis EL.

The left rear telescopic element 722 includes a left rear outer tube 722a (an example of a left outer portion) and a left rear inner tube 722b (an example of a left inner portion). An outer diameter of the left rear outer tube 722a is greater than an outer diameter of the left rear inner tube 722b. The left rear outer tube 722a is disposed directly behind the left front outer tube 721a in the front-rear direction of the body frame 21. The left rear outer tube 722a is supported by the left bracket 71. The left rear inner tube 722b is disposed directly behind the left front inner tube 721b in the front-rear direction of the body frame 21. The left rear inner tube 722b is connected to the left rear outer tube 722a so as to slide along the left telescopic axis EL.

The left upper connecting member 723 connects the left front outer tube 721a and the left rear outer tube 722a together.

The left lower connecting member 724 connects the left front inner tube 721b and the left rear inner tube 722b together.

One end (a left end) of the left axle 725 is supported on the left front inner tube 721b and the left rear inner tube 722b via the left lower connecting member 724. The other end (a right end) of the left axle 725 supports the left front wheel 31.

The left shock absorber 72 attenuates or absorbs a displacement of the left front wheel 31 towards the linkage 5 in the up-down direction of the body frame 21. In particular, the left rear telescopic element 722 defines a left shock absorber. The left front telescopic element 721, the left upper connecting member 723 and the left lower connecting member 724 define a left turn restrictor and restrict the relative turning between the left rear outer tube 722a and the left rear inner tube 722b.

As shown in FIGS. 2 to 4, the vehicle 1 includes a right suspension 8. The right suspension 8 includes a right bracket 81 and a right shock absorber 82. The configuration of the right suspension 8 is symmetrical with the left suspension 7 when the vehicle 1 is viewed from the left in the left-right direction of the body frame 21. Thus, the right suspension 8 is not illustrated separately, and only reference numerals for the right suspension 8 will be shown in FIG. 2.

The right bracket 81 includes a right turning member, not shown, at an upper portion thereof. The right turning member is disposed in an interior of the right side member 54 and extends in the same orientation as the direction in which the right side member 54 extends. The right turning member is able to turn about a right steering axis SR relative to the right side member 54. Namely, the right bracket 81 is connected to the right side member 54 so as to turn about the right steering axis SR. The right steering axis SR extends in the direction in which the right side member 54 extends. As shown in FIG. 3, the right steering axis SR extends parallel to the rear intermediate steering axis SIB of the upstream steering shaft 62 in the up-down direction of the body frame 21. As shown in FIG. 4, the right steering axis SR extends parallel to the rear intermediate steering axis SIB of the upstream steering shaft 62 in the up-down direction of the body frame 21.

The right shock absorber 82 is preferably a so-called telescopic shock absorber mechanism. As shown in FIG. 2, the right shock absorber 82 includes a right front telescopic element 821, a right rear telescopic element 822, a right upper connecting member 823, a right lower connecting member 824 and a right axle 825.

The right front telescopic element 821 includes a right front outer tube 821a (an example of a right guide portion) and a right front inner tube 821b (an example of a right guided portion). An outer diameter of the right front outer tube 821a is greater than an outer diameter of the right front inner tube 821b. The right front outer tube 821a is supported by the right bracket 81. The right front inner tube 821b is connected to the right front outer tube 821a so as to slide along a right telescopic axis ER.

The right rear telescopic element 822 includes a right rear outer tube 822a (an example of a right outer portion) and a right rear inner tube 822b (an example of a right inner portion). An outer diameter of the right rear outer tube 822a is greater than an outer diameter of the right rear inner tube 822b. The right rear outer tube 822a is disposed directly behind the right front outer tube 821a in the front-rear direction of the body frame 21. The right rear outer tube 822a is supported by the right bracket 81. The right rear inner tube 822b is disposed directly behind the right front inner tube 821b in the front-rear direction of the body frame 21. The right rear inner tube 822b is connected to the right rear outer tube 822a so as to slide along the right telescopic axis ER.

The right upper connecting member 823 connects the right front outer tube 821a and the right rear outer tube 822a together.

The right lower connecting member 824 connects the right front inner tube 821b and the right rear inner tube 822b together.

One end (a right end) of the right axle 825 is supported on the right front inner tube 821b and the right rear inner tube 822b via the right lower connecting member 824. The other end (a left end) of the right axle 825 supports the right front wheel 32.

The right shock absorber 82 attenuates or absorbs a displacement of the right front wheel 32 towards the linkage 5 in the up-down direction of the body frame 21. In particular, the right rear telescopic element 822 defines a right shock absorber. The right front telescopic element 821, the right upper connecting member 823 and the right lower connecting member 824 define a right turn restrictor and restrict the relative turning between the right rear outer tube 822a and the right rear inner tube 822b.

As shown in FIGS. 2 to 4, the vehicle 1 includes a steering force transmission 9. The steering force transmission 9 includes a downstream steering shaft 91, a connecting device 92, an intermediate transmission plate 93, a left transmission plate 94, a right transmission plate 95, an intermediate joint 96, a left joint 97, a right joint 98 and a tie-rod 99.

The downstream steering shaft 91 is supported on the link support 212 so as to turn about a front intermediate steering axis SIF. The front intermediate steering axis SIF extends parallel to the rear intermediate steering axis SIB about which the upstream steering shaft 62 turns.

The connecting device 92 connects the upstream steering shaft 62 and the downstream steering shaft 91 together. The connecting device 92 is displaced in association with the turning of the upstream steering shaft 62. The downstream steering shaft 91 turns in association with the displacement of the connecting device 92. Namely, the connecting device 92 transmits a turning operation of the upstream steering shaft 62 to the downstream steering shaft 91.

The intermediate transmission plate 93 (an example of an intermediate turning portion) is connected to a lower portion of the downstream steering shaft 91. The intermediate transmission plate 93 is not able to turn relative to the downstream steering shaft 91. The intermediate transmission plate 93 is able to turn about the front intermediate steering axis SIF relative to the link support 212.

The left transmission plate 94 (an example of a left turning portion) is disposed directly on the left of the intermediate transmission plate 93 in the left-right direction of the body frame 21. The left transmission plate 94 is connected to a lower portion of the left bracket 71. The left transmission plate 94 is not able to turn relative to the left bracket 71. The left transmission plate 94 is able to turn about the left steering axis SL relative to the left side member 53.

The right transmission plate 95 (an example of a right turning portion) is disposed directly on the right of the intermediate transmission plate 93 in the left-right direction of the body frame 21. The right transmission plate 95 is connected to a lower portion of the right bracket 81. The right transmission plate 95 is not able to turn relative to the right bracket 81. The right transmission plate 95 is able to turn about the right steering axis SR relative to the right side member 54.

As shown in FIG. 4, the intermediate joint 96 is connected to a front portion of the intermediate transmission plate 93 via a shaft portion that extends in the up-down direction of the body frame 21. The intermediate transmission plate 93 and the intermediate joint 96 are able to turn relative to each other about this shaft portion.

The left joint 97 is disposed on the left of the intermediate joint 96 in the left-right direction of the body frame 21. The left joint 97 is connected to a front portion of the left transmission plate 94 via a shaft portion that extends in the up-down direction of the body frame 21. The left transmission plate 94 and the left joint 97 are able to turn relative to each other about this shaft portion.

The right joint 98 is disposed on the right of the intermediate joint 96 in the left-right direction of the body frame 21. The right joint 98 is connected to a front portion of the right transmission plate 95 via a shaft portion that extends in the up-down direction of the body frame. The right transmission plate 95 and the right joint 98 are able to turn relative to each other about this shaft portion.

A shaft portion that extends in the front-rear direction of the body frame 21 is provided at a front portion of the intermediate joint 96. A shaft portion that extends in the front-rear direction of the body frame 21 is provided at a front portion of the left joint 97. A shaft portion that extends in the front-rear direction of the body frame 21 is provided at a front portion of the right joint 98.

The tie-rod 99 (an example of a connector) extends in the left-right direction of the body frame 21. The tie-rod 99 is connected to the intermediate joint 96, the left joint 97 and the right joint 98 via those shaft portions. The tie-rod 99 and the intermediate joint 96 are able to turn relative to each other about the shaft portion that is provided at the front portion of the intermediate joint 96. The tie-rod 99 and the left joint 97 are able to turn relative to each other about the shaft portion that is provided at the front portion of the left joint 97. The tie-rod 99 and the right joint 98 are able to turn relative to each other about the shaft portion that is provided at the front portion of the right joint 98.

The left transmission plate 94 is connected to the intermediate transmission plate 93 via the left joint 97, the tie-rod 99, and the intermediate joint 96. The right transmission plate 95 is connected to the intermediate transmission plate 93 via the right joint 98, the tie-rod 99 and the intermediate joint 96. The left transmission plate 94 and the right transmission plate 95 are connected to each other via the left joint 97, the tie-rod 99 and the right joint 98. In other words, the tie-rod 99 connects the intermediate transmission plate 93 to the left transmission plate 94 and the right transmission plate 95.

Figure 5:
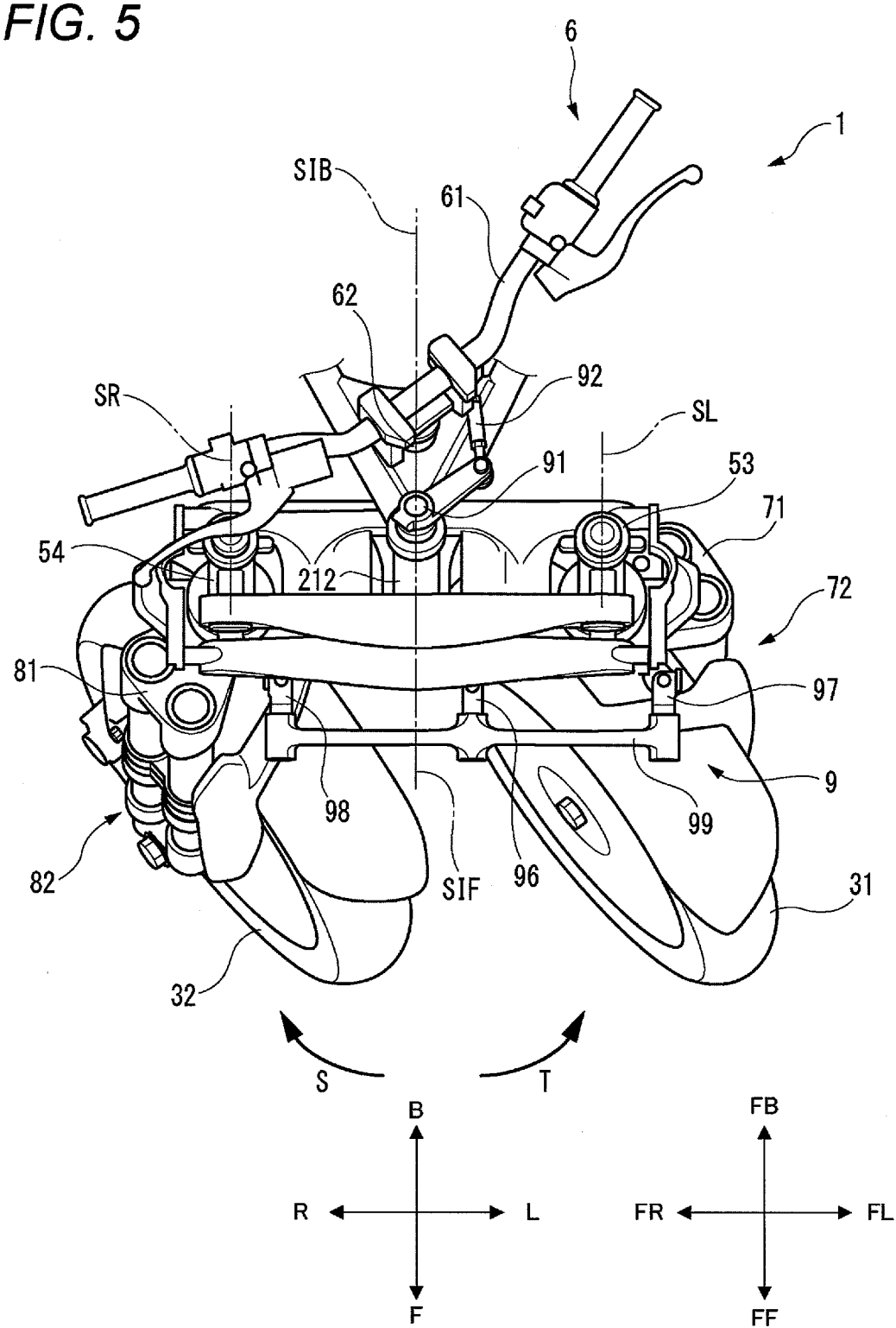
FIG. 5 is a plan view showing the front portion of the vehicle of FIG. 1 when steering is performed.

Next, referring to FIGS. 4 and 5, a steering operation of the vehicle 1 will be described. FIG. 5 is a plan view of the front portion of the vehicle 1 that is in such a state that the left front wheel 31 and the right front wheel 32 are turned to the left, as viewed from above in the up-down direction of the body frame 21. In FIG. 5, the front cover 221 is omitted from illustration.

When the rider operates the handlebar 61, the upstream steering shaft 62 is turned about the rear intermediate steering axis SIB relative to the head pipe 211. The turning operation of the upstream steering shaft 62 is transmitted to the downstream steering shaft 91 via the connecting device 92. When the turning of the upstream steering shaft 62 is transmitted to the downstream steering shaft 91, the downstream steering shaft 91 is turned relative to the link support 212 about the front intermediate steering axis SIF. In the case of the downstream steering shaft 91 being turned to the left as shown in FIG. 5, the steering shaft 91 turns in a direction indicated by an arrow T. In association with the turning of the downstream steering shaft 91, the intermediate transmission plate 93 turns in the direction indicated by the arrow T about the front intermediate steering axis SIF relative to the link support 212.

In association with the turning of the intermediate transmission plate 93 in the direction indicated by the arrow T, the intermediate joint 96 turns relative to the intermediate transmission plate 93 in a direction indicated by an arrow S. This causes the tie-rod 99 to move to the left in the left-right direction of the body frame 21 and to the rear in the front-rear direction of the body frame 21 while maintaining its posture.

In association with the movement of the tie-rod 99, the left joint 97 and the right joint 98 turn in the direction indicated by the arrow S relative to the left transmission plate 94 and the right transmission plate 95, respectively. This turns the left transmission plate 94 and the right transmission plate 95 in the direction indicated by the arrow T while allowing the tie-rod 99 to maintain its posture.

When the left transmission plate 94 turns in the direction indicated by the arrow T, the left bracket 71, which is not able to turn relative to the left transmission plate 94, is turned in the direction indicated by the arrow T about the left steering axis SL relative to the left side member 53.

When the right transmission plate 95 turns in the direction indicated by the arrow T, the right bracket 81, which is not able to turn relative to the right transmission plate 95, is turned in the direction indicated by the arrow T about the right steering axis SR relative to the right side member 54.

When the left bracket 71 is turned in the direction indicated by the arrow T, the left shock absorber 72, which is supported on the left bracket 71, is turned in the direction indicated by the arrow T about the left steering axis SL relative to the left side member 53. When the left shock absorber 72 is turned in the direction indicated by the arrow T, the left front wheel 31, which is supported on the left shock absorber 72, is turned in the direction indicated by the arrow T about the left steering axis SL relative to the left side member 53.

When the right bracket 81 is turned in the direction indicated by the arrow T, the right shock absorber 82, which is supported on the right bracket 81, is turned in the direction indicated by the arrow T about the right steering axis SR relative to the right side member 54. When the right shock absorber 82 is turned in the direction indicated by the arrow T, the right front wheel 32, which is supported on the right shock absorber 82, is turned in the direction indicated by the arrow T about the right steering axis SR relative to the right side member 54.

When the rider operates the handlebar 61 so as to turn to the right, the elements described above turn in opposite directions to the directions in which they turn when the vehicle turns to the left. Since the elements merely move the other way around in relation to the left-right direction, detailed description thereof will be omitted here.

Thus, as has been described above, the steering member 6 transmits the steering force to the left front wheel 31 and the right front wheel 32 in response to the operation of the handlebar 61 by the rider. The left front wheel 31 and the right front wheel 32 turn about the left steering axis SL and the right steering axis SR, respectively, in the direction corresponding to the direction in which the handlebar 61 is operated by the rider.

Figure 6:
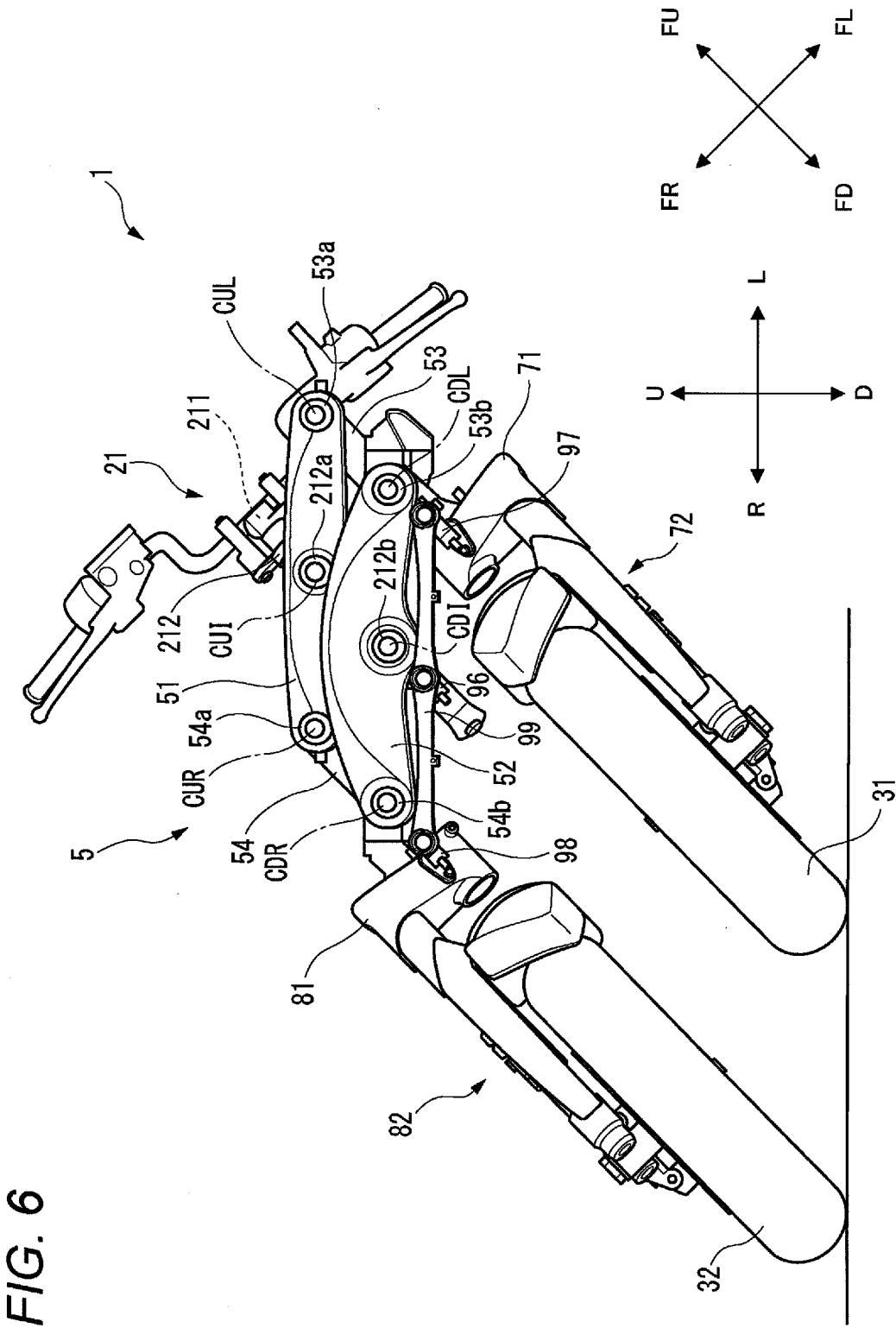
FIG. 6 is a front view showing the front portion of the vehicle of FIG. 1 when leaning is performed.

Next, referring to FIGS. 3 and 6, a leaning operation of the vehicle 1 will be described. FIG. 6 is a front view of the front portion of the vehicle 1, when viewed from the front in the front-rear direction of the body frame 21, with the body frame 21 caused to lean to the left of the vehicle 1. In FIG. 6, the front cover 221 is omitted from illustration.

As shown in FIG. 3, when the vehicle 1 is viewed from the front of the body frame 21 that is standing upright, the linkage 5 exhibits a rectangular shape. As shown in FIG. 6, when the vehicle 1 is viewed from the front of the body frame 21 that is leaning, the linkage 5 exhibits a parallelogram shape. The operation of the linkage 5 is interlocked with the leaning of the body frame 21 in the left-right direction. The operation of the linkage 5 means that the shape of the linkage 5 changes as a result of the upper cross member 51 and the lower cross member 52 turning relative to the link support 212 about the upper intermediate connecting axis CUI and the lower intermediate connecting axis CDI, respectively, and the upper cross member 51, the lower cross member 52, the left side member 53 and the right side member 54 turning relatively about the upper left connecting axis CUL, the upper right connecting axis CUR, the lower left connecting axis CDL and the lower right connecting axis CDR, respectively.

For example, as shown in FIG. 6, when the rider causes the vehicle 1 to lean to the left, the head pipe 211 and the link support 212 lean to the left from the vertical direction. When the head pipe 211 and the link support 212 lean, the upper cross member 51 turns counterclockwise about the upper intermediate connecting axis CUI that passes the upper intermediate connector 212a relative to the link support 212 when viewed from the front of the vehicle 1. Similarly, the lower cross member 52 is turned counterclockwise about the lower intermediate connecting axis CDI that passes the lower intermediate connector 212b relative to the head pipe 211 when viewed from the front of the vehicle 1. This causes the upper cross member 51 to move to the left in the left-right direction of the body frame 21 relative to the lower cross member 52.

By moving in the way described above, the upper cross member 51 turns counterclockwise about the upper left connecting axis CUL that passes the upper left connector 53a and the upper right connecting axis CUR that passes the upper right connector 54a relative to the left side member 53 and the right side member 54, respectively when viewed from the front of the vehicle 1. Similarly, the lower cross member 52 turns counterclockwise about the lower left connecting axis CDL that passes the lower left connector 53b and the lower right connecting axis CDR that passes the lower right connector 54b relative to the left side member 53 and the right side member 54, respectively, when viewed from the front of the vehicle 1. By moving in the way described above, the left side member 53 and the right side member 54 lean to the left of the vehicle 1 from the vertical direction while maintaining postures that are parallel to the head pipe 211 and the link support 212.

As this occurs, the lower cross member 52 moves to the left in the left-right direction of the body frame 21 relative to the tie-rod 99. As a result of the lower cross member 52 moving in the way described above, the shaft portions that are provided at the respective front portions of the intermediate joint 96, the left joint 97 and the right joint 98 turn relative to the tie-rod 99. This allows the tie-rod 99 to hold a posture that is parallel to the upper cross member 51 and the lower cross member 52.

As the left side member 53 leans to the left of the vehicle 1, the left bracket 71 that is supported on the left side member 53 via the left turning member leans to the left of the vehicle 1. In association with the leftward leaning of the left bracket 71, the left shock absorber 72 that is supported on the left bracket 71 also leans to the left of the vehicle 1. As a result of the left shock absorber 72 leaning in the way described above, the left front wheel 31 that is supported on the left shock absorber 72 leans to the left of the vehicle 1 while maintaining its posture that is parallel to the head pipe 211 and the link support 212.

As the right side member 54 leans to the left of the vehicle 1, the right bracket 81 that is supported on the right side member 54 via the right turning member leans to the left of the vehicle 1. In association with the leftward leaning of the right bracket 81, the right shock absorber 82 that is supported on the right bracket 81 also leans to the left of the vehicle 1. As a result of the right shock absorber 82 leaning in the way described above, the right front wheel 32 that is supported on the right shock absorber 82 leans to the left of the vehicle 1 while maintaining its posture that is parallel to the head pipe 211 and the link support 212.

The description of the leaning operations of the left front wheel 31 and the right front wheel 32 is made based on the vertical direction. However, when the vehicle 1 leans (when the linkage 5 is operated), the up-down direction of the body frame 21 is not coincident with the vertical direction. In the event of this being described based on the up-down direction of the body frame 21, when the linkage 5 is operated, the left front wheel 31 and the right front wheel 32 change their relative positions in the up-down direction of the body frame 21. In other words, the linkage 5 changes the relative positions of the left front wheel 31 and the right front wheel 32 in the up-down direction of the body frame 21 to cause the body frame 21 to lean to the left or right of the vehicle 1 from the vertical direction.

When the rider causes the vehicle 1 to lean to the right, the elements lean to the right. Since the elements merely move the other way around in relation to the left-right direction, detailed description thereof will be omitted here.

Figure 7:
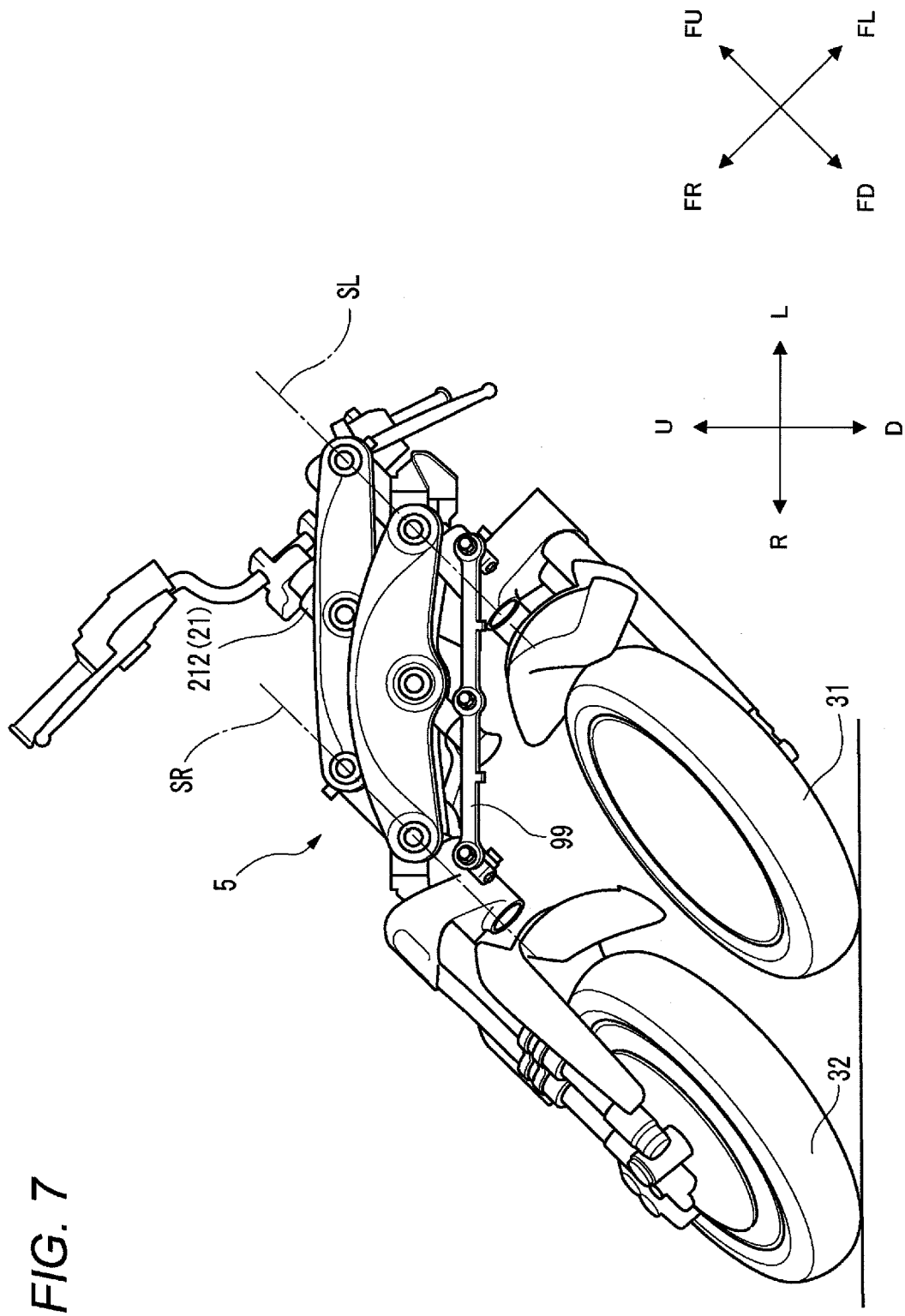
FIG. 7 is a front view showing the front portion of the vehicle of FIG. 1 when steering and leaning are performed.

FIG. 7 is a front view of the front portion of the vehicle 1, when viewed from the front in the front-rear direction of the body frame 21, in such a state that the vehicle 1 is caused to lean and turn. FIG. 7 shows a state in which the vehicle 1 is steered or turned to the left while being caused to lean to the left. In FIG. 7, the front cover 221 is omitted from illustration.

When a steering operation is performed, the left front wheel 31 is turned counterclockwise about the left steering axis SL, while the right front wheel 32 is turned counterclockwise about the right steering axis SR. When a leaning operation is performed, the left front wheel 31 and the right front wheel 32 lean to the left of the vehicle 1 together with the body frame 21. Namely, in this state, the linkage 5 exhibits the parallelogram shape. The tie-rod 99 moves to the left in the left-right direction of the body frame 21 and to the rear in the front-rear direction of the body frame 21 from the position where the body frame 21 is in the upright state.

The configuration is known in which a recess (a relief portion) that the left shock absorber and the right shock absorber is able to enter is provided in the lower cross member. According to this configuration, enlargement in the size of the vehicle in the up-down direction is prevented while avoiding the interference of the left shock absorber and the right shock absorber with the lower cross member when the body frame leans. However, since the displacement amount of the left shock absorber and the right shock absorber towards the lower cross member increases as the maximum banking angle increases, a deeper recess needs to be provided. This will be true when attempting to increase the stroke, too. In order to avoid a reduction in the rigidity that would be caused by the recess, the dimension of the lower cross member in the up-down direction of the body frame needs to be increased. As a result, it becomes difficult to prevent enlargement in the size of the vehicle in the up-down direction.

The inventors of preferred embodiments of the present invention conceived that the advantages described above are achieved by providing the left shock absorber and the right shock absorber in place of the conventional countermeasures regarding the shape of the lower cross member.

In a case where the left shock absorber is disposed so that the left telescopic axis is positioned on the right of the left steering axis in the left-right direction of the body frame and the right shock absorber is disposed so that the right telescopic axis is positioned on the left of the right steering axis in the left-right direction of the body frame when the vehicle in which the body frame is standing upright is viewed from the front in the front-rear direction of the body frame, a portion of the lower cross member where the left shock absorber and the right shock absorber could interfere with the lower cross member is positioned between the left steering axis and the right steering axis when the vehicle in which the body frame is standing upright is viewed from the front in the front-rear direction of the body frame. This portion is highly related to the rigidity of the lower cross member. In other words, it can be said that this portion has a relatively low degree of freedom in selecting a shape therefor from the viewpoint of ensuring the rigidity.

On the other hand, in a case where the left shock absorber is disposed so that the left telescopic axis is positioned on the left of the left steering axis in the left-right direction of the body frame when the vehicle in which the body frame is standing upright is viewed from the front in the front-rear direction of the body frame, a portion of the lower cross member where the left shock absorber could interfere with the lower cross member is positioned between the left steering axis and the left end of the lower cross member when the vehicle in which the body frame is standing upright is viewed from the front in the front-rear direction of the body frame. Similarly, in a case where the right shock absorber is disposed so that the right telescopic axis is positioned on the right of the right steering axis in the left-right direction of the body frame when the vehicle in which the body frame is standing upright is viewed from the front in the front-rear direction of the body frame, a portion of the lower cross member where the right shock absorber could interfere with the lower cross member is positioned between the right steering axis and the right end of the lower cross member when the vehicle in which the body frame is standing upright is viewed from the front in the front-rear direction of the body frame. These portions are relatively less related to the rigidity of the lower cross member. In other words, it can be said that these portions have a relatively high degree of freedom in selecting shapes therefor from the viewpoint of ensuring the rigidity of the lower cross member.

The inventors of preferred embodiments of the present invention conceived that it would be advantageous to dispose the left shock absorber and the right shock absorber in the position where the left shock absorber and the right shock absorber could interfere with the portions that would be relatively less related to the rigidity of the lower cross member and which have a relatively high degree of freedom in selecting the shapes of the portions from the viewpoint of ensuring the rigidity of the lower cross member.

Figure 8:
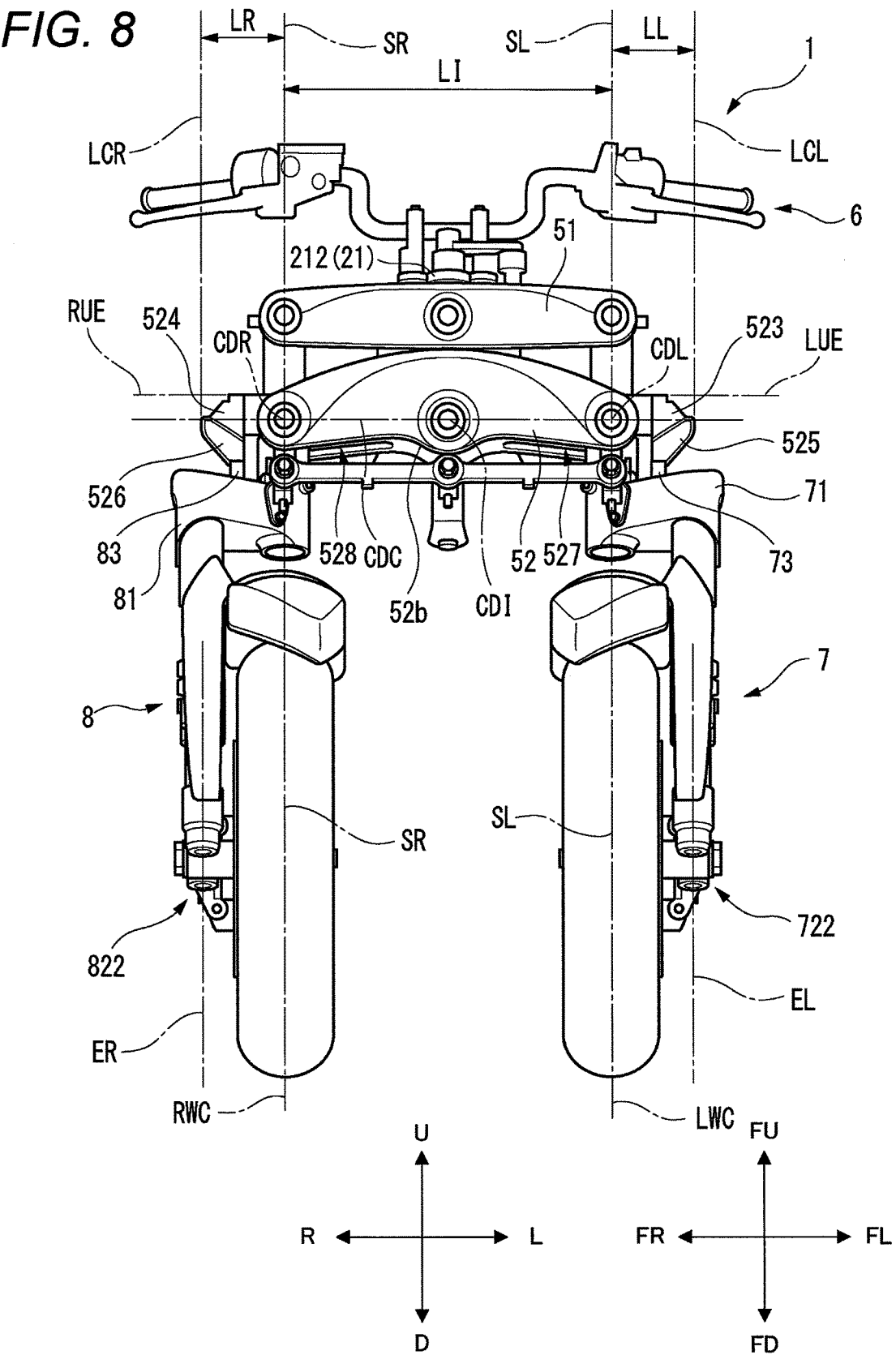
FIG. 8 is a front view showing the front portion of the vehicle of FIG. 1.

FIG. 8 is a front view of the front portion of the vehicle 1 resulting when viewed from the front in the front-rear direction of the body frame 21. In FIG. 8, the body frame 21 is in the upright state. The following description to be made while referring to FIG. 8 is based on the premise that the body frame 21 is in the upright state. In FIG. 8, the front cover 221 is omitted from illustration.

Figure 9:
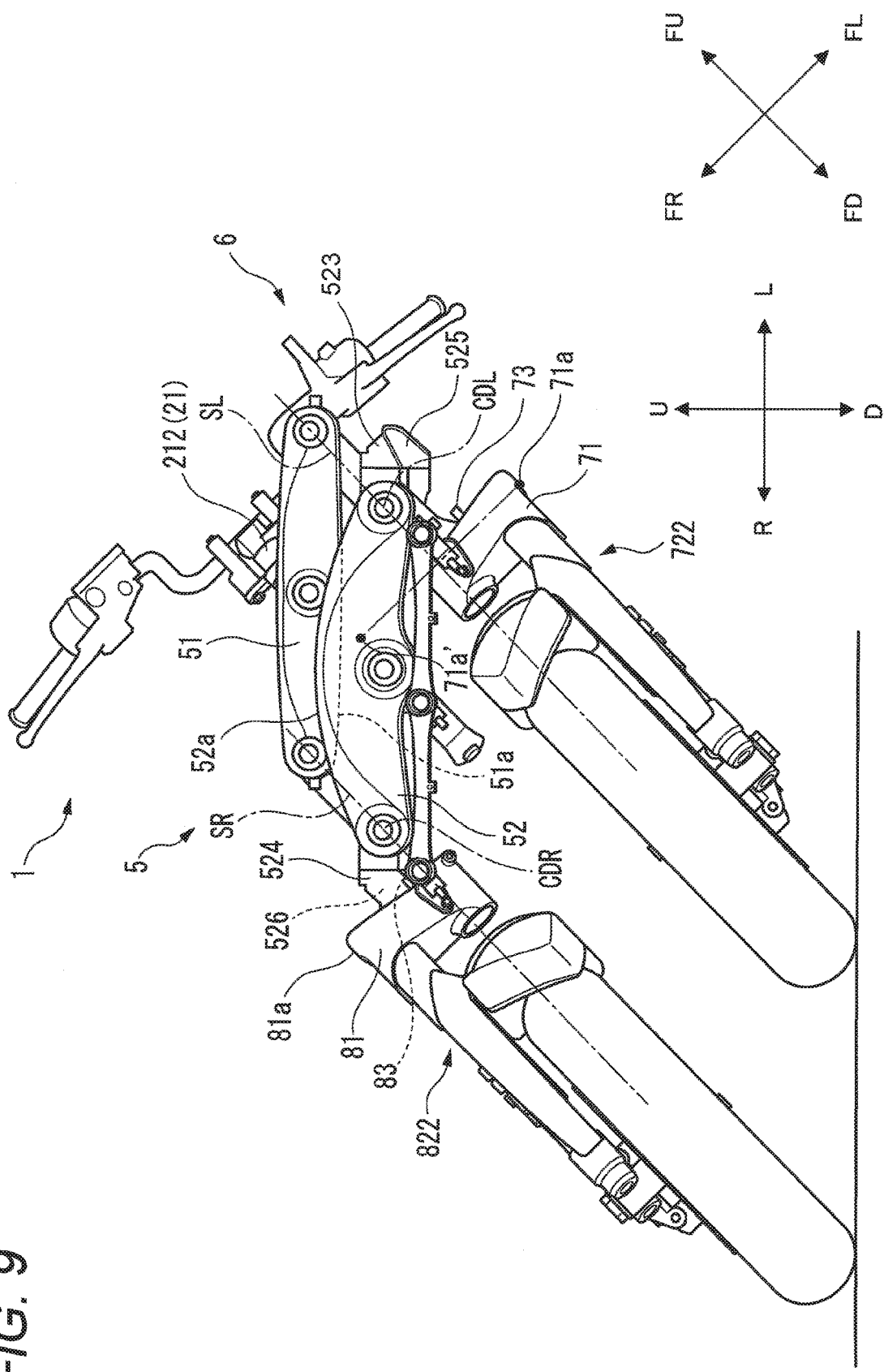
FIG. 9 is a front view showing the front portion of the vehicle of FIG. 1 when leaning is performed.

FIG. 9 is a front view of the front portion of the vehicle 1, when viewed from the front in the front-rear direction of the body frame 21, in which the body frame 21 is caused to lean to the left with the maximum angle. In FIG. 9, the front cover 221 is omitted from illustration.

As shown in FIG. 8, in the vehicle 1 according to this preferred embodiment, a distance LL between the left steering axis SL and a left end LCL of the lower cross member 52 in the left-right direction of the body frame 21 is shorter than a distance LI between the left steering axis SL and the right steering axis SR in the left-right direction of the body frame 21 when the vehicle 1 in which the body frame 21 is standing upright is viewed from the front in the front-rear direction of the body frame 21. On the other hand, a distance LR between the right steering axis SR and a right end LCR of the lower cross member 52 in the left-right direction of the body frame 21 is shorter than the distance LI between the left steering axis SL and the right steering axis SR in the left-right direction of the body frame 21 when the vehicle 1 in which the body frame 21 is standing upright is viewed from the front in the front-rear direction of the body frame 21.

Further, in the vehicle 1 according to this preferred embodiment, based on the description above, the left rear telescopic element 722 that defines the left shock absorber is disposed so that the left telescopic axis EL is positioned on the left of the left steering axis SL in the left-right direction of the body frame when the vehicle 1 in which the body frame 21 is standing upright is viewed from the front in the front-rear direction of the body frame 21. On the other hand, the right rear telescopic element 822 that defines the right shock absorber is disposed so that the right telescopic axis ER is positioned on the right of the right steering axis SR in the left-right direction of the body frame. This configuration is advantageous in the following points.

Firstly, the left shock absorber (the left rear telescopic element 722) moves away from the portion that is positioned between the left steering axis SL and the left end LCL of the lower cross member 52 as the vehicle 1 leans to the left. On the other hand, the right shock absorber (the right rear telescopic element 822) moves towards the portion that is between the right steering axis SR and the right end LCR of the lower cross member 52. Since the portion positioned on the right of the right steering axis SR has a high degree of freedom of space, however, the shape and arrangement of the right suspension 8 is easily selected as to avoid the interference of both members. Accordingly, it is easy to shorten the distance between the right shock absorber (the right rear telescopic element 822) and the lower cross member 52 in the up-down direction of the body frame 21. Similarly, the right shock absorber (the right rear telescopic element 822) moves away from the portion that is positioned between the right steering axis SR and the right end LCR of the lower cross member 52 as the vehicle 1 leans to the right. On the other hand, the left shock absorber (the left rear telescopic element 722) moves towards the portion that is between the left steering axis SL and the left end LCL of the lower cross member 52. Since the portion positioned on the left of the left steering axis SL has a high degree of freedom of space, however, the shape and arrangement of the left suspension 7 is easily selected as to avoid the interference of both members. Accordingly, it is easy to shorten the distance between the left shock absorber (the left rear telescopic element 722) and the lower cross member 52 in the up-down direction of the body frame 21.

Specifically, as shown in FIG. 9, the shape and arrangement of the left suspension 7 are selected so that the lower cross member 52 is positioned in a position 71a' that is axisymmetric with a left end 71a of the left bracket 71 with respect to the left steering axis SL when the vehicle 1 in which the body frame 21 is caused to lean to the left with the maximum angle is viewed from the front in the front-rear direction of the body frame 21. The left end 71a of the left bracket 71 is an example of a point where a left edge of the left suspension 7 is defined when the vehicle 1 in which the body frame 21 is caused to lean to the left with the maximum angle is viewed from the front in the front-rear direction of the body frame 21.

The axisymmetric position 71a' corresponds to a location where a right end of the left bracket 71 is positioned when the vehicle 1 is caused to lean to the left with the maximum angle at which the left rear telescopic element 722 is disposed on the right of the left steering axis SL in the left-right direction of the body frame 21. Namely, this means that the lower cross member 52 interferes with the left bracket 71. To avoid the interference, the left bracket 71 that supports the left shock absorber (the left rear telescopic element 722) needs to be disposed below the left bracket 71, and enlargement in the size of the vehicle 1 in the up-down direction of the body frame 21 cannot be avoided. According to the configuration of this preferred embodiment, when the vehicle 1 leans to the left, the left end portion of the lower cross member 52 and the left shock absorber (the left rear telescopic element 722) move way from each other. On the other hand, since the portion positioned directly on the right of the right steering axis SR has a high degree of freedom of space, it is easy to avoid the interference of the right end portion of the lower cross member 52 with the right shock absorber 82. Consequently, it is easy to reduce the distance between the lower cross member 52 and the left shock absorber (the left rear telescopic element 722) in the up-down direction of the body frame 21.

Although the illustration is omitted due to the configuration being symmetrical relative to the left-right direction, the shape and arrangement of the right suspension 8 are selected so that the lower cross member 52 is positioned in a position that is axisymmetric with a right end 81a of the right bracket 81 with respect to the right steering axis SR when the vehicle 1 in which the body frame 21 is caused to lean to the right with the maximum angle is viewed from the front in the front-rear direction of the body frame 21. The right end 81a of the right bracket 81 is an example of a point where a right edge of the right suspension 8 is defined when the vehicle 1 in which the body frame 21 is caused to lean to the right with the maximum angle is viewed from the front in the front-rear direction of the body frame 21.

The axisymmetric position corresponds to a location where a left end of the right bracket 81 is positioned when the vehicle 1 is caused to lean to the right with the maximum angle at which the right rear telescopic element 822 is disposed on the left of the right steering axis SR in the left-right direction of the body frame 21. Namely, this means that the lower cross member 52 interferes with the right bracket 81. To avoid the interference, the right bracket 81 that supports the right shock absorber (the right rear telescopic element 822) needs to be disposed below the right bracket 81, and enlargement in the size of the vehicle 1 in the up-down direction of the body frame cannot be avoided. According to the configuration of this preferred embodiment, when the vehicle 1 leans to the right, the right end portion of the lower cross member 52 and the right shock absorber (the right rear telescopic element 822) move way from each other. On the other hand, since the portion positioned directly on the left of the left steering axis SL has a high degree of freedom of space, it is easy to avoid the interference of the left end portion of the lower cross member 52 with the left shock absorber 72. Consequently, it is easy to reduce the distance between the lower cross member 52 and the right shock absorber (the right rear telescopic element 822) in the up-down direction of the body frame 21.

Secondly, even though a recess where a portion of the left suspension 7 is able to enter is provided in the portion that is positioned between the left steering axis SL and the left end LCL of the lower cross member 52 in order to avoid the interference of the left suspension 7 with the lower cross member 52, a possible reduction in the rigidity of the lower cross member 52 is kept to a minimum. Similarly, even though a recess where a portion of the right suspension 8 is able to enter is provided in the portion that is positioned between the right steering axis SR and the right end LCR of the lower cross member 52 in order to avoid the interference of the right suspension 8 with the lower cross member 52, a possible reduction in the rigidity of the lower cross member 52 is kept to a minimum.

Thirdly, since the dimension of the lower cross member 52 in the up-down direction of the body frame 21 does not have to be increased, a distance between the upper cross member 51 and the lower cross member 52 in the up-down direction of the body frame 21 that could avoid the interference therebetween is shortened.

Even though the maximum banking angle and the stroke of the suspensions are increased, enlargement in the size of the vehicle 1 in the up-down direction is prevented by the synergetic action of the first advantageous effect, the second advantageous effect and the third advantageous effect.

FIG. 10 is a plan view of the front portion of the vehicle 1 viewed from above in the up-down direction of the body frame 21 when the left front wheel 31 and the right front wheel 32 are turned to the left. In FIG. 10, the front cover 221 is omitted from illustration.

As shown in FIGS. 8 and 10, a left portion of the front element 521 and a left portion of the rear element 522 of the lower cross member 52 are connected together by the left connecting member 523. A right portion of the front element 521 and a right portion of the rear element 522 of the lower cross member 52 are connected together by the right connecting member 524.

The left portion of the front element 521, the left portion of the rear element 522 and the left connecting member 523 define a left recess 525 on a left peripheral edge of the lower cross member 52. The left peripheral edge of the lower cross member 52 is positioned on the left of the lower left connecting axis CDL in the left-right direction of the body frame 21.

The right portion of the front element 521, the right portion of the rear element 522 and the right connecting member 524 define a right recess 526 on a right peripheral edge of the lower cross member 52. The right peripheral edge of the lower cross member 52 is positioned on the right of the lower right connecting axis CDR in the left-right direction of the body frame 21.

As shown in FIG. 8, the left suspension 7 includes a left turn restrictor 73. The left turn restrictor 73 is a pin-shaped member that extends upwards from an upper portion of the left bracket 71 in the up-down direction of the body frame 21. When the vehicle 1 is standing upright, the left turn restrictor 73 faces the left recess 525 of the lower cross member 52 with a certain space defined therebetween.

On the other hand, the right suspension 8 includes a right turn restrictor 83. The right turn restrictor 83 is a pin-shaped member that extends upwards from an upper portion of the right bracket 81 in the up-down direction of the body frame 21. When the vehicle 1 is standing upright, the right turn restrictor 83 faces the right recess 526 of the lower cross member 52 with a certain space defined therebetween.

As shown in FIG. 9, when the body frame 21 leans from the upright state to the left of the vehicle 1 at a predetermined angle or greater, the right turn restrictor 83 (an example of a portion of the right suspension) enters the right recess 526 of the lower cross member 52. On the other hand, when the body frame 21 leans from the upright state to the right of the vehicle 1 at a predetermined angle or greater, the left turn restrictor 73 (an example of a portion of the left suspension) enters the left recess 525 of the lower cross member 52.

According to the configuration described above, even though the left recess 525 avoids the interference of the lower cross member 52 with a portion of the left suspension 7 and the right recess 526 avoids the interference of the lower cross member 52 with a portion of the right suspension 8, any influence that would reduce the rigidity of the lower cross member 52 is prevented. Consequently, since a large contribution to the second advantageous effect and the third advantageous effect is obtained, enlargement in the size of the vehicle 1 in the up-down direction is prevented even though the maximum banking angle and the stroke of the suspensions are increased.

As shown in FIG. 8, an upper end LUE of the left recess 525 and an upper end RUE of the right recess 526 in the up-down direction of the body frame 21 are positioned above a straight line CDC that connects the lower left connecting axis CDL and the lower right connecting axis CDR in the up-down direction of the body frame 21.

As described above, the left recess 525 is provided on the left peripheral edge of the lower cross member 52, and the right recess 526 is provided on the right peripheral edge of the lower cross member 52. Accordingly, although the depth in which the left turn restrictor 73 and the right turn restrictor 83 enter is increased by setting the positions of the upper end LUE of the left recess 525 and the upper end RUE of the right recess 526 in the way described above, any influence that would reduce the rigidity of the lower cross member 52 is prevented. Consequently, since a large contribution to the second advantageous effect and the third advantageous effect is obtained, enlargement in the size of the vehicle 1 in the up-down direction is prevented even though the maximum banking angle and the stroke of the suspensions are increased.

Figure 11A:
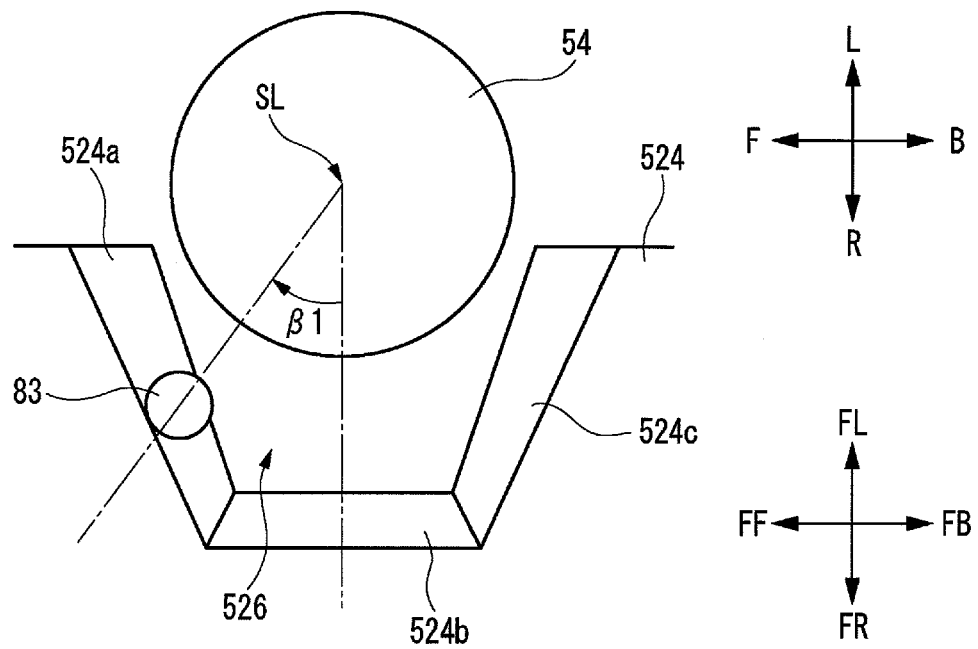
FIGS. 11A and 11B are schematic views for explaining a mechanism that restricts the steering angle.
Figure 11B:
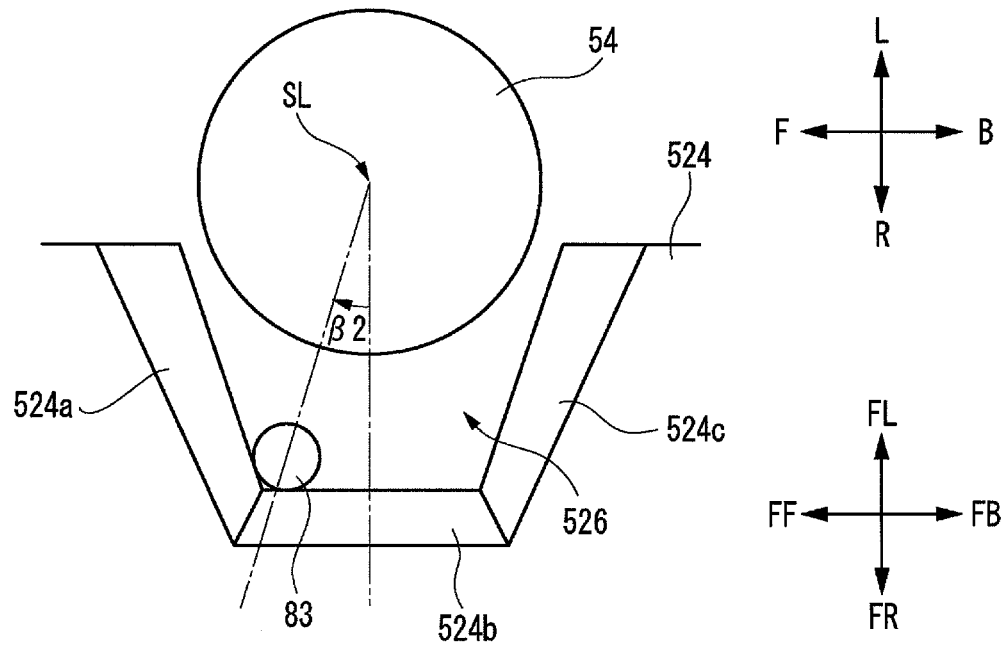
Figure 12:
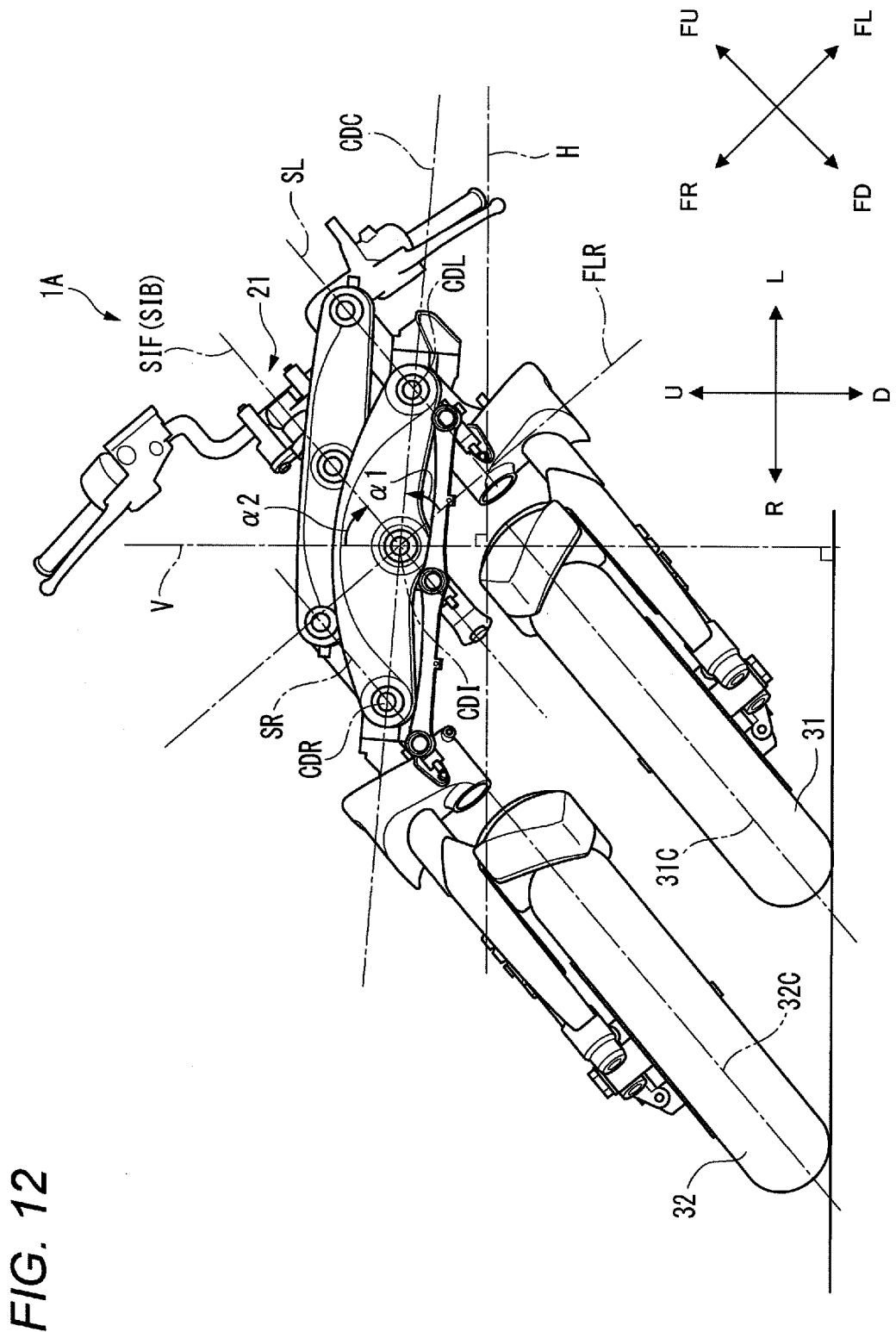
FIG. 12 is a front view showing a front portion of the vehicle according to a modified preferred embodiment of the present invention.

Next, referring to FIGS. 11A and 11B, the function of the left turn restrictor 73 and the right turn restrictor 83 will be described. FIGS. 11A and 11B show schematically a positional relationship among the right side member 54, the right turn restrictor 83 and the right connecting member 524 as viewed from the below in the up-down direction of the body frame 21.

The right connecting member 524 includes a right front wall 524a, a right side wall 524b and a right rear wall 524c. The right front wall 524a, the right side wall 524b and the right rear wall 524c define the right recess 526. The right connecting member 524 has a shape in which a space between the right front wall 524a and the right rear wall 524c becomes narrower as it moves to the right in the left-right direction of the body frame 21. The right connecting member 524 has a shape in which a space between the right front wall 524a and the right rear wall 524c becomes narrower as it moves upwards in the up-down direction of the body frame 21.

As described while referring to FIG. 9, when the body frame 21 leans from the upright state to the left of the vehicle 1 at the predetermined angle or greater, the right turn restrictor 83 enters the right recess 526 of the lower cross member 52. When the vehicle 1 is turned to the left in this state, by the action of the steering force transmission 9 described above, the left bracket 71 turns about the left steering axis SL, and the right bracket 81 turns about the right steering axis SR. Here, the right turn restrictor 83 provided on the right bracket 81 moves within the right recess 526 of the lower cross member 52.

Since the right recess 526 that is defined by the right connecting member 524 has the shape described above, as the leaning angle of the body frame 21 to the left of the vehicle 1 increases, the movable amount of the right turn restrictor 83 within the right recess 526 is reduced. For example, FIG. 11A shows a state in which the leaning angle of the body frame 21 to the left of the vehicle 1 is relatively small. When the vehicle 1 is turned to the left in this state, the right bracket 81, not shown, turns clockwise in the figure about the right steering axis SR. When the turning angle reaches β1, the right turn restrictor 83 is brought into abutment with the right front wall 524a of the right connecting member 524, such that the right bracket 81 is prevented from further turning.

FIG. 11B shows a state in which the leaning angle of the body frame 21 to the left of the vehicle 1 is relatively great. When the vehicle 1 is turned to the left in this state, the right bracket 81, not shown, turns clockwise in the figure about the right steering axis SR. When the turning angle reaches β2, the right turn restrictor 83 is brought into abutment with the right front wall 524a of the right connecting member 524, such that the right bracket 81 is prevented from further turning. The turning angle β2 is smaller than the turning angle β1.

Consequently, as the leaning angle of the body frame 21 to the left of the vehicle 1 increases, the turn angle of the steering member 6 to turn the vehicle 1 to the left is reduced.

Although the illustration of the left connecting member 523 is omitted since the construction thereof is symmetrical with the right connecting member 524 relative to the left-right direction, the left connecting member 523 includes a left front wall, a left side wall and a left rear wall. The left front wall, the left side wall and the left rear wall define the left recess 525. The left connecting member 523 has a shape in which a space between the left front wall and the left rear wall becomes narrower toward the left in the left-right direction of the body frame 21. The left connecting member 523 has a shape in which a space between the left front wall and the left rear wall becomes narrower toward the top in the up-down direction of the body frame 21.

When the body frame 21 leans from the upright state to the right of the vehicle 1 at the predetermined angle or greater, the left turn restrictor 73 enters the left recess 525 of the lower cross member 52. When the vehicle 1 is turned to the right in this state, by the action of the steering force transmission 9 described above, the left bracket 71 turns about the left steering axis SL, and the right bracket 81 turns about the right steering axis SR. As this occurs, the left turn restrictor 73 provided on the left bracket 71 moves within the left recess 525 of the lower cross member 52.

Since the left recess 525 that is defined by the left connecting member 523 has the shape described above, as the leaning angle of the body frame 21 to the right of the vehicle 1 increases, the movable amount of the left turn restrictor 73 within the left recess 52 is reduced. Consequently, as the leaning angle of the body frame 21 to the right of the vehicle 1 increases, the turn angle of the steering member 6 to turn the vehicle 1 to the right is reduced.

Namely, the mechanism that restricts the turning angle of the steering member 6 according to the leaning angle of the body frame 21 is provided by using the portion where the degree of freedom in selecting the shape is relatively high from the viewpoint of ensuring the rigidity of the lower cross member 52. In other words, the mechanism does not have to be provided in the location positioned between the left steering axis SL and the right steering axis SR of the lower cross member 52, that is, the portion that is highly related to ensuring the rigidity of the lower cross member 52. Consequently, even though the maximum banking angle and the stroke of the suspensions are increased, not only is enlargement in the size of the vehicle 1 in the up-down direction prevented, but also a countermeasure to enhance the rigidity of the lower cross member 52 is easily provided.

Further, in this preferred embodiment, the lower cross member 52 includes the front element 521 and the rear element 522. The left end portion of the front element 521 and the left end portion of the rear element 522 are connected together by the left connecting member 523. The left recess 525 is defined by the left connecting member 523. On the other hand, the right end portion of the front element 521 and the right end portion of the rear element 522 are connected together by the right connecting member 524. The right recess 526 is defined by the right connecting member 524.

According to the configuration described above, the left recess 525 having the desired shape is easily provided by the left connecting member 523 that is separate from the front element 521 and the rear element 522. Similarly, the right recess 526 having the desired shape is easily provided by the right connecting member 524 that is separate from the front element 521 and the rear element 522. Consequently, even though the maximum banking angle and the stroke of the suspensions are increased, not only is enlargement in the size of the vehicle 1 in the up-down direction prevented, but also the mechanism that restricts the turning angle of the steering member 6 according to the leaning angle of the body frame 21 is easily provided.

FIG. 9 shows a state in which the body frame 21 is caused to lean to the left of the vehicle 1 with the maximum angle. When the vehicle 1 in this state is viewed from a direction that follows the lower left connecting axis CDL and the lower right connecting axis CDR, an upper edge 52a of the lower cross member 52 includes a portion that is positioned above a lower edge 51a of the upper cross member 51 in the vertical direction. Accordingly, a portion of the lower cross member 52 seems to overlap the upper cross member 51.

Although the illustration thereof is omitted, this will be true with a state in which the body frame 21 is caused to lean to the right of the vehicle 1 from the upright state thereof with the maximum angle.

By defining the positional relationship between the upper edge 52a of the lower cross member 52 and the lower edge 51a of the upper cross member 51 in the way described above, enlargement in the size of the linkage 5 in relation to the up-down direction of the body frame 21 is prevented. Consequently, even though the maximum banking angle and the stroke of the suspensions are increased, enlargement in the size of the vehicle 1 in the up-down direction is further prevented.

As shown in FIG. 8, the left front wheel 31 is disposed on the left rear telescopic element 722 that defines the left shock absorber in the left-right direction of the body frame 21. On the other hand, the right front wheel 32 is disposed on the left of the right rear telescopic element 822 that defines the right shock absorber in the left-right direction of the body frame 21.

Namely, the left front wheel 31 and the right front wheel 32 are disposed between the left shock absorber and the right shock absorber. According to this configuration, even though the maximum banking angle and the stroke of the suspensions are increased, not only is enlargement in the size of the vehicle 1 in the up-down direction prevented, but also enlargement in the size of the vehicle 1 in the left-right direction is prevented.

Further, the left front wheel 31 is disposed on the right of the left front telescopic element 721 that defines the left turn restrictor in the left-right direction of the body frame 21. On the other hand, the right front wheel 32 is disposed on the left of the right front telescopic element 821 that defines the right turn restrictor in the left-right direction of the body frame 21.

Namely, the left front wheel 31 and the right front wheel 32 are disposed between the left shock absorber, the left turn restrictor, the right shock absorber and the right turn restrictor. According to this configuration, even though the maximum banking angle and the stroke of the suspensions are increased, not only is enlargement in the size of the vehicle 1 in the up-down direction prevented, but also enlargement in the size of the vehicle 1 in the left-right direction is further prevented.

FIG. 10 shows a state in which the steering member 6 is turned to the maximum turning angle to turn the vehicle 1 to the left. In other words, FIG. 10 shows a state in which the steering member 6 is turned to the maximum turning angle in the counterclockwise direction as viewed by the rider. In this state, a front end 821c of the right front telescopic element 821 that defines the right turn restrictor and a front end 822c of the right rear telescopic element 822 that defines the right shock absorber are disposed ahead of a rear end 99a of the tie-rod 99 in the front-rear direction of the body frame 21.

Although the illustration thereof is omitted, in such a state that the steering member 6 is turned to the maximum turning angle to turn the vehicle 1 to the right, in other words, in such a state that the steering member 6 is turned to the maximum turning angle in the clockwise direction as viewed by the rider, the front end of the right front telescopic element 821 that defines the right turn restrictor and the front end of the right rear telescopic element 822 that defines the right shock absorber are disposed ahead of the rear end 99a of the tie-rod 99 in the front-rear direction of the body frame 21.

According to this configuration, since the necessity of considering the avoidance of the interference of the lower cross member 52 with the left suspension 7 and the right suspension 8 is reduced, it is possible to prevent enlargement in the size of the steering force transmission 9 in relation to the front-rear direction of the body frame 21. Even though the maximum banking angle and the stroke of the suspensions are increased, not only is enlargement in the size of the vehicle 1 in the up-down direction prevented, but also enlargement in the size of the vehicle 1 in the front-rear direction is prevented.

As shown in FIG. 8, a lower edge 52b of the lower cross member 52 that is positioned between the lower left connecting axis CDL and the lower right connecting axis CDR is positioned below the straight line CDC that connects the lower left connecting axis CDL and the lower right connecting axis CDR in the up-down direction of the body frame 21 when the vehicle 1 in which the body frame 21 is standing upright is viewed from the direction that follows the lower left connecting axis CDL and the lower right connecting axis CDR.

According to this configuration, even though a relief portion where the lower edge 52b of the lower cross member 52 is recessed upwards with a large extent is not provided between the lower left connecting axis CDL and the lower right connecting axis CDR, it is possible to avoid the interference of the lower cross member 52 with a portion of the left suspension 7 and a portion of the right suspension 8. By using this configuration, the rigidity of the lower cross portion 52 is enhanced. In other words, the dimension of the lower cross member 52 in the up-down direction of the body frame 21 does not have to be increased in order to ensure the rigidity thereof. Consequently, even though the maximum banking angle and the stroke of the suspensions are increased, enlargement in the size of the vehicle 1 in the up-down direction is prevented.

The preferred embodiments that have been described heretofore are intended to facilitate the understanding of the present invention and are not intended to limit the present invention. The preferred embodiments of the present invention can be modified without departing from the scope thereof and that their equivalents can also be included in the present invention.

In the above preferred embodiments, the left steering axis SL preferably coincides with the center line of the left front wheel 31 in the left-right direction of the body frame 21, and the right steering axis SR preferably coincides with the center line of the right front wheel 32 in the left-right direction of the body frame 21. However, a configuration shown in FIG. 12 can be used. In a vehicle 1A according to a modified example, a center line 31C of the left front wheel 31 in the left-right direction of the body frame 21 is positioned on the right of the left steering axis SL in the left-right direction of the body frame 21. On the other hand, a center line 32C of the right front wheel 32 in the left-right direction of the body frame 21 is positioned on the left of the right steering axis SR in the left-right direction of the body frame 21.

According to this configuration, when the body frame 21 leans to the left of the vehicle 1A, the straight line CDC that connects the lower left connecting axis CDL and the lower right connecting axis CDR together is inclined relative to a line H that is parallel to the road surface. Specifically, the lower right connecting axis CDR is positioned above the lower left connecting axis CDL. Consequently, a turning angle $\alpha 1$ of the lower cross member 52 about the lower intermediate connecting axis CDI becomes smaller than a leaning angle $\alpha 2$ at which the body frame 21 is caused to lean to the left of the vehicle 1 from the upright state. The turning angle $\alpha 1$ is defined as an angle that is defined by the straight line CDC and a straight line FLR that is parallel to the left-right direction of the body frame 21. The leaning angle $\alpha 2$ is defined as an angle that is defined by a line V orthogonal to the road surface and the front intermediate steering axis SIF or the rear intermediate steering axis SIB.

Although the illustration is omitted due to the configuration being symmetrical relative to the left-right direction, when the body frame 21 leans to the right of the vehicle 1A, the straight line CDC that connects the lower left connecting axis CDL and the lower right connecting axis CDR together is inclined relative to the line H that is parallel to the road surface so that the lower left connecting axis CDL is positioned above the lower right connecting axis CDR. Consequently, a turning angle of the lower cross member 52 about the lower intermediate connecting axis CDI becomes smaller than the leaning angle of the body frame 21 to the right of the vehicle 1 from the upright state thereof.

According to this configuration, the movable range of the linkage 5 in the up-down direction of the body frame 21 is reduced. Consequently, even though the maximum banking angle and the stroke of the suspensions are increased, enlargement in the size of the vehicle 1 in the up-down direction is further prevented.

In the above preferred embodiments, the lower cross member 52 includes the front element 521 and the rear element 522. The left recess 525 of the lower cross member 52 is preferably defined by the left connecting member 523 that connects the left end portion of the front element 521 and the left end portion of the rear element 522 together. The right recess 526 of the lower cross member 52 is preferably defined by the right connecting member 524 that connects the right end portion of the front element 521 and the right end portion of the rear element 522 together. However, the left recess 525 may be provided directly on the left peripheral edge of the lower cross member 52 without using the left connecting member 523 that is a separate member. Similarly, the right recess 526 may be provided directly on the right peripheral edge of the lower cross member 52 without using the right connecting member 524 that is a separate member.

In the above preferred embodiments, the left rear telescopic element 722 of the left suspension 7 preferably defines the left shock absorber, and the left front telescopic element 721, the left upper connecting member 723 and the left lower connecting member 724 preferably define the left turn restrictor. However, a configuration may be used in which the left front telescopic element 721 defines the left shock absorber, and the left rear telescopic element 722, the left upper connecting member 723 and the left lower connecting member 724 define the left turn restrictor.

In the above preferred embodiments, the right rear telescopic element 822 of the right suspension 8 preferably defines the right shock absorber, and the right front telescopic element 821, the right upper connecting member 823 and the right lower connecting member 824 preferably define the right turn restrictor. However, a configuration may be used in which the right front telescopic element 821 defines the right shock absorber, and the right rear telescopic element 822, the right upper connecting member 823 and the right lower connecting member 824 define the right turn restrictor.

In the above preferred embodiments, both the telescopic element of the left suspension 7 that defines the left shock absorber and the telescopic element thereof that defines the left turn restrictor are preferably disposed directly on the left of the left front wheel 31 in the left-right direction of the body frame 21. However, the telescopic element that defines the left turn restrictor may be disposed directly on the right of the left front wheel 31 in the left-right direction of the body frame 21.

In the above preferred embodiments, both the telescopic element of the right suspension 8 that defines the right shock absorber and the telescopic element thereof that defines the right turn restrictor are preferably disposed directly on the right of the right front wheel 32 in the left-right direction of the body frame 21. However, the telescopic element that defines the right turn restrictor may be disposed directly on the left of the right front wheel 32 in the left-right direction of the body frame 21.

In the above preferred embodiments, in such a state that the steering member 6 is turned in the counterclockwise direction as viewed by the rider to the maximum turning angle, both the front end of the telescopic element that defines the right turn restrictor and the front end of the telescopic element that defines the right shock absorber are preferably disposed ahead of the rear end 99*a* of the tie-rod 99 in the front-rear direction of the body frame 21. However, a configuration may be used in which of the front end of the telescopic element that defines the right turn restrictor and the front end of the telescopic element that defines the right shock absorber, only the one that is disposed ahead of the other is disposed ahead of the rear end 99*a* of the tie-rod 99 in the front-rear direction of the body frame 21 in the same state.

In the above preferred embodiments, in such a state that the steering member 6 is turned in the clockwise direction as viewed by the rider to the maximum turning angle, both the front end of the telescopic element that defines the left turn restrictor and the front end of the telescopic element that defines the left shock absorber are preferably disposed ahead of the rear end 99*a* of the tie-rod 99 in the front-rear direction of the body frame 21. However, a configuration may be used in which of the front end of the telescopic element that defines the left turn restrictor and the front end of the telescopic element that defines the left shock absorber, only the one that is disposed ahead of the other is disposed ahead of the rear end 99*a* of the tie-rod 99 in the front-rear direction of the body frame 21 in the same state.

In the above preferred embodiments, the left front outer tube 721*a* and the left rear outer tube 722*a* are preferably supported on the left bracket 71. However, a configuration may be used in which the left front inner tube 721*b* and the left rear inner tube 722*b* are supported on the left bracket 71.

In the above preferred embodiments, the right front outer tube 821*a* and the right rear outer tube 822*a* are preferably supported on the right bracket 81. However, a configuration may be used in which the right front inner tube 821*b* and the right rear inner tube 822*b* are supported on the right bracket 81.

As shown in FIG. 8, a left lower space 527 that is recessed upwards with a slight extent is provided on a lower portion of the lower cross member 52 that is positioned between the lower left connector 53*b* and the lower intermediate connector 211*b*. The left lower space 527 may be used as a relief portion where a portion of the left suspension 7 enters when the vehicle 1 is caused to lean to the left of the vehicle 1.

On the other hand, a right lower space 528 that is recessed upwards with a slight extent is provided on a lower portion of the lower cross member 52 that is positioned between the lower right connector 54*b* and the lower intermediate connector 211*b*. The right lower space 528 may be used as a relief portion where a portion of the right suspension 8 enters when the vehicle 1 is caused to lean to the right of the vehicle 1.

In the above preferred embodiments, the vehicle 1 preferably includes a single rear wheel 4. However, the vehicle 1 may include a plurality of rear wheels.

In the above preferred embodiments, the upper cross member 51 is preferably a single plate member, while the lower cross member 52 preferably includes the front element 521 and the rear element 522. However, a configuration may be used in which the upper cross member 51 also includes a front element and a rear element. A configuration may be used in which at least one of the upper cross member 51 and the lower cross member 52 includes a left plate member that is supported on the link support 212 and the left side member 53 and a right plate member that is supported on the link support 212 and the right side member 54.

In the above preferred embodiments, the handlebar 61 is defined by a single member that extends in the left-right direction of the body frame. However, a configuration may be used in which the handlebar 61 is defined by a left handlebar operated by the left hand of the rider and a right handlebar operated by the right hand of the rider that are provided as separate members, as long as the steering force to turn the left front wheel 31 and the right front wheel 32 is able to be inputted through the handlebar 61.

In the above preferred embodiments, the steering force transmission 9 preferably includes the intermediate transmission plate 93, the left transmission plate 94, the right transmission plate 95, the intermediate joint 96, the left joint 97, the right joint 98, and the tie-rod 99. However, the intermediate transmission plate 93, the left transmission plate 94, the right transmission plate 95, the intermediate joint 96, the left joint 97, and the right joint 98 may be replaced by appropriate elements such as universal joints as required, as long as the steering force inputted from the handlebar 61 is able to be transmitted to the left suspension 7 and the right suspension 8 by way of the tie-rod 99.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of about ±40 degrees are included therein. When used in this description to depict directions and members, the expression reading "along a certain direction" means that where something inclines at an angle falling within the range of about ±40 degrees relative to the certain direction is comprised therein. When used in this description, the expression reading "something extends in a certain direction" means that a case where something extends while being inclined at an angle falling within the range of about ±40 degrees relative to the certain direction is included therein.

When used in this description, the expression "so as not to be movable relative to the body frame 21" means that a certain portion or member is caused to lean in the left-right direction of the vehicle 1 together with the body frame 21 when the body frame 21 is caused to lean in the left-right direction of the vehicle 1. When used in this description, the expression "so as not to be movable relative to the body frame 21" may include not only a case where a certain portion or member is directly fixed to the body frame but also a case where the certain portion of member is fixed to a vehicle component (a fuel tank, a bracket, the power unit 24, etc.) which is fixed on the body frame 21. Here the term "fixed" may include a case that a certain portion or member is fixed by way of a damping member or the like.

The present invention can be implemented with many different preferred embodiments. This description should be understood to provide principle preferred embodiments of the present invention. The preferred embodiments which are at least described or illustrated in this description are so described or illustrated based on the understanding that the preferred embodiments are not intended to limit the present invention.

The present invention comprehends every preferred embodiment which includes an equivalent element, a modification, a deletion, a combination (for example, a combination of characteristics of various preferred embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this specification or the prosecution of this patent application. The preferred embodiments of the present invention should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   a left front wheel and a right front wheel that are arranged side by side in a left-right direction of the body frame;
   a linkage disposed above the left front wheel and the right front wheel in an up-down direction of the body frame, and that changes positions of the left front wheel and the right front wheel relative to the body frame to cause the body frame to lean to the left or to the right of the vehicle;
   a left telescopic suspension that supports the left front wheel and attenuates or absorbs a displacement of the left front wheel toward the linkage in the up-down direction of the body frame; and
   a right telescopic suspension that supports the right front wheel and attenuates or absorbs a displacement of the right front wheel toward the linkage in the up-down direction of the body frame; wherein
   the linkage includes:
      an upper cross member;
      a lower cross member disposed below the upper cross member in the up-down direction of the body frame;
      a left side member disposed above the left front wheel in the up-down direction of the body frame and that supports the left telescopic suspension such that the left telescopic suspension is able to turn about a left steering axis extending in the up-down direction of the body frame;
      a right side member disposed above the right front wheel in the up-down direction of the body frame and that supports the right telescopic suspension such that the right telescopic suspension is able to turn about a right steering axis extending in the up-down direction of the body frame; wherein
      the upper cross member, the lower cross member, the left side member, and the right side member are connected such that the upper cross member and the lower cross member maintain postures that are parallel to each other, and such that the left side member and the right side member maintain postures that are parallel to each other;
   the left telescopic suspension includes:
      a left shock absorber including a left inner portion and a left outer portion that are movable relative to each other along a left telescopic axis extending in the up-down direction of the body frame; and
      a left turn restrictor including a left guide portion and a left guided portion that are movable relative to each other in a direction parallel to the left telescopic axis and that restrict relative turning of the left inner portion and the left outer portion; wherein
      one of the left inner portion and the left outer portion supports the left front wheel;
      the other one of the left inner portion and the left outer portion is supported by the left side member;
      one of the left guide portion and the left guided portion is connected to the left inner portion;
      the other one of the left guide portion and the left guided portion is connected to the left outer portion;
   the right telescopic suspension includes:
      a right shock absorber including a right inner portion and a right outer portion that are movable relative to each other along a right telescopic axis extending in the up-down direction of the body frame; and
      a right turn restrictor including a right guide portion and a right guided portion that are movable relative to each other in a direction parallel to the right telescopic axis and that restrict relative turning of the right inner portion and the right outer portion; wherein
      one of the right inner portion and the right outer portion supports the right front wheel;

the other one of the right inner portion and the right outer portion is supported by the right side member;

one of the right guide portion and the right guided portion is connected to the right inner portion;

the other one of the right guide portion and the right guided portion is connected to the right outer portion;

a distance between the left steering axis and a left end of the lower cross member in the left-right direction of the body frame is shorter than a distance between the left steering axis and the right steering axis in the left-right direction of the body frame when the vehicle in which the body frame is standing upright is viewed from a front in a front-rear direction of the body frame;

a distance between the right steering axis and a right end of the lower cross member in the left-right direction of the body frame is shorter than a distance between the left steering axis and the right steering axis in the left-right direction of the body frame when the vehicle in which the body frame is standing upright is viewed from the front in the front-rear direction of the body frame;

the left shock absorber is disposed such that the left telescopic axis is positioned on the left of the left steering axis in the left-right direction of the body frame when the vehicle in which the body frame is standing upright is viewed from the front in the front-rear direction of the body frame;

the right shock absorber is disposed such that the right telescopic axis is positioned on the right of the right steering axis in the left-right direction of the body frame when the vehicle in which the body frame is standing upright is viewed from the front in the front-rear direction of the body frame.

2. The vehicle according to claim 1, wherein the lower cross member is axisymmetric with a left edge of the left telescopic suspension relative to the left steering axis when the body frame is caused to lean to the left at a maximum angle; and the lower cross member is axisymmetric with a right edge of the right telescopic suspension relative to the right steering axis when the body frame is caused to lean to the right at a maximum angle.

3. The vehicle according to claim 1, wherein a left portion of the lower cross member is supported on a lower portion of the left side member such that the left portion of the lower cross member is able to turn about a lower left connecting axis extending in the front-rear direction of the body frame;

a right portion of the lower cross member is supported on a lower portion of the right side member such that the right portion of the lower cross member is able to turn about a lower right connecting axis extending in the front-rear direction of the body frame;

the lower cross member includes a left recess at a left peripheral edge that is positioned on the left of the lower left connecting axis in the left-right direction of the body frame;

the lower cross member includes a right recess at a right peripheral edge that is positioned on the right of the lower right connecting axis in the left-right direction of the body frame;

a portion of the right telescopic suspension is able to enter the right recess at least when the body frame is caused to lean from an upright state thereof to the left at a maximum angle; and a portion of the left telescopic suspension is able to enter the left recess at least when the body frame is caused to lean from the upright state thereof to the right at a maximum angle.

4. The vehicle according to claim 3, wherein an upper end of the left recess and an upper end of the right recess in the up-down direction of the body frame are positioned above a straight line connecting the lower left connecting axis and the lower right connecting axis in the up-down direction of the body frame.

5. The vehicle according to claim 3, further comprising:

a steering member that is able to turn about a turn axis relative to the body frame; and a steering force transmission that causes the left telescopic suspension and the right telescopic suspension to turn in a direction that the steering member is turned; wherein the portion of the left telescopic suspension in the left recess is movable within the left recess in accordance with the turning of the left telescopic suspension about the left steering axis;

the left recess is structured such that a movable amount of the portion of the left telescopic suspension within the left recess is reduced as a leaning angle of the body frame to the right increases;

the portion of the right telescopic suspension in the right recess is movable within the right recess in accordance with the turning of the right telescopic suspension about the right steering axis; and the right recess is structured such that a movable amount of the portion of the right telescopic suspension within the right recess is reduced as a leaning angle of the body frame to the left increases.

6. The vehicle according to claim 5, wherein the lower cross member includes:

a front element disposed ahead of the left side member and the right side member in the front-rear direction of the body frame;

a rear element disposed behind the left side member and the right side member in the front-rear direction of the body frame;

a left connecting member connecting a left end portion of the front element and a left end portion of the rear element; and a right connecting member connecting a right end portion of the front element and a right end portion of the rear element; wherein the left recess is defined by the left connecting member; and the right recess is defined by the right connecting member.

7. The vehicle according to claim 1, wherein a left portion of the lower cross member is supported on a lower portion of the left side member such that the left portion of the lower cross member is able to turn about a lower left connecting axis extending in the front-rear direction of the body frame;

a right portion of the lower cross member is supported on a lower portion of the right side member such that the right portion of the lower cross member is able to turn about a lower right connecting axis extending in the front-rear direction of the body frame; and an upper edge of the lower cross member includes a portion positioned above a lower edge of the upper cross member in a vertical direction when the body frame is caused to lean from an upright state thereof to the left or to the right at a maximum leaning angle, and viewed from a direction along the lower left connecting axis and the lower right connecting axis.

8. The vehicle according to claim 1, wherein a left portion of the lower cross member is supported on a lower portion of the left side member such that the left portion of the lower cross member is able to turn about a lower left connecting axis extending in the front-rear direction of the body frame;
- a right portion of the lower cross member is supported on a lower portion of the right side member such that the right portion of the lower cross member is able to turn about a lower right connecting axis extending in the front-rear direction of the body frame; and
- when the body frame is caused to lean from an upright state thereof to the left or to the right at a maximum leaning angle, a turn angle of the lower cross member about the lower left connecting axis and the lower right connecting axis is smaller than the maximum leaning angle.

9. The vehicle according to claim 1, wherein the left front wheel is disposed on the right of the left shock absorber in the left-right direction of the body frame; and
- the right front wheel is disposed on the left of the right shock absorber in the left-right direction of the body frame.

10. The vehicle according to claim 9, wherein the left front wheel is disposed on the right of the left turn restrictor in the left-right direction of the body frame; and
- the right front wheel is disposed on the left of the right turn restrictor in the left-right direction of the body frame.

11. The vehicle according to claim 1, further comprising:
- a steering member that is able to turn about a turn axis relative to the body frame; and
- a steering force transmission that causes the left telescopic suspension and the right telescopic suspension to turn in a direction that the steering member is turned; wherein
- the steering force transmission includes:
  - an intermediate turning portion that is able to turn about an intermediate steering axis in accordance with the turning of the steering member;
  - a left turning portion disposed directly on the left of the intermediate turning portion in the left-right direction of the body frame, and connected to the left telescopic suspension so as to be able to turn about the left steering axis;
  - a right turning portion disposed directly on the right of the intermediate turning portion in the left-right direction of the body frame, and connected to the right telescopic suspension so as to be able to turn about the right steering axis; and
- a connector connecting the intermediate turning portion with the left turning portion and the right turning portion; wherein
- at least one of a front end of the left shock absorber and a front end of the left turn restrictor is positioned ahead of a rear end of the connector in the front-rear direction of the body frame when the steering member is turned clockwise, as viewed by a rider, at a maximum angle; and
- at least one of a front end of the right shock absorber and a front end of the right turn restrictor is positioned ahead of the rear end of the connector in the front-rear direction of the body frame when the steering member is turned counterclockwise, as viewed by the rider, at a maximum angle.

12. The vehicle according to claim 1, wherein a left portion of the lower cross member is supported on a lower portion of the left side member such that the left portion of the lower cross member is able to turn about a lower left connecting axis extending in the front-rear direction of the body frame;
- a right portion of the lower cross member is supported on a lower portion of the right side member such that the right portion of the lower cross member is able to turn about a lower right connecting axis extending in the front-rear direction of the body frame; and
- a lower edge of the lower cross member that is positioned between the lower left connecting axis and the lower right connecting axis is positioned below a straight line connecting the lower left connecting axis and the lower right connecting axis in the up-down direction of the body frame when the vehicle in which the body frame is standing upright is viewed from a direction along the lower left connecting axis and the lower right connecting axis.

* * * * *